United States Patent
Yang

(10) Patent No.: US 12,511,058 B1
(45) Date of Patent: Dec. 30, 2025

(54) METHOD FOR PERFORMING READ-DISTURBANCE DETECTION OF MEMORY DEVICE WITH AID OF HASHING-BASED ADDRESS MAPPING FOR DATA INTEGRITY CONTROL, AND ASSOCIATED APPARATUS

(71) Applicant: Silicon Motion, Inc., Hsinchu County (TW)

(72) Inventor: Tsung-Chieh Yang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/940,870

(22) Filed: Nov. 8, 2024

(51) Int. Cl.
*G06F 3/06* (2006.01)
*G06F 12/10* (2016.01)

(52) U.S. Cl.
CPC .......... *G06F 3/0619* (2013.01); *G06F 3/0653* (2013.01); *G06F 3/0679* (2013.01); *G06F 12/10* (2013.01)

(58) Field of Classification Search
CPC .. G06F 12/0246; G06F 3/0619; G06F 3/0653; G06F 3/0679; G06F 12/10; G06F 2212/7201
USPC ...................................... 711/103, 216, 12.06
See application file for complete search history.

(56) References Cited

U.S. PATENT DOCUMENTS

| | | | | |
|---|---|---|---|---|
| 10,877,883 | B2* | 12/2020 | Hwang | G11C 16/3422 |
| 2012/0198174 | A1* | 8/2012 | Nellans | G06F 3/065 |
| | | | | 711/E12.009 |
| 2012/0221774 | A1* | 8/2012 | Atkisson | G06F 12/126 |
| | | | | 711/135 |
| 2014/0325115 | A1 | 10/2014 | Ramsundar | |
| 2015/0026449 | A1 | 1/2015 | Heo | |
| 2021/0349653 | A1* | 11/2021 | DeWitt | G06F 11/0727 |
| 2024/0152423 | A1* | 5/2024 | Swami | G06F 11/1068 |

FOREIGN PATENT DOCUMENTS

| | | |
|---|---|---|
| TW | 201734794 A | 10/2017 |
| TW | 202418087 A | 5/2024 |

* cited by examiner

*Primary Examiner* — Jared I Rutz
*Assistant Examiner* — Edward Waddy, Jr.
(74) *Attorney, Agent, or Firm* — Winston Hsu

(57) ABSTRACT

A method for performing read-disturbance detection of memory device with aid of hashing-based address mapping for data integrity control and associated apparatus are provided. The method may include: establishing a read count table for recording multiple first read counts with respect to multiple first addresses; performing the hashing-based address mapping on a set of second addresses at which reading operations are detected in order to convert the set of second addresses into a set of first addresses, for updating a set of first read counts; monitoring at least a highest first read count to determine whether the highest first read count reaches a first read count threshold; performing reverse mapping on a first address at which the highest first read count is detected in order to convert the first address into a set of target second addresses; and performing a media scan procedure with respect to the target second addresses.

19 Claims, 10 Drawing Sheets

METHOD FOR PERFORMING READ-DISTURBANCE DETECTION OF MEMORY DEVICE WITH AID OF HASHING-BASED ADDRESS MAPPING FOR DATA INTEGRITY CONTROL, AND ASSOCIATED APPARATUS

BACKGROUND OF THE INVENTION

1. Field of the Invention

The present invention is related to memory control, and more particularly, to a method for performing read-disturbance detection of a memory device with the aid of hashing-based address mapping for data integrity control, and associated apparatus such as the memory device, an electronic device comprising the memory device, a memory controller within the memory device, etc.

2. Description of the Prior Art

A memory device may comprise flash memory for storing data, and the management of accessing the flash memory is complicated. For example, the memory device may be a memory card, an embedded storage device, or a solid state drive (SSD) such as that conforming to Peripheral Component Interconnect Express (PCIe) specification. The memory device may be arranged to store various files such as system files, user files, etc. in a file system of a host. More particularly, memory devices such as PCIe SSDs may be ideal for running database applications on computers because of their speed, low latency, scalability, reliability, and support for advanced protocols like NVMe, and may significantly increase the performance and responsiveness of database systems, thereby improving efficiency and user experience. According to the related art, a database system may divide a PCIe SSD into multiple data spaces of different sizes for various usage scenarios and read different data spaces in parallel at the same time, where it is more likely to frequently read the file directory region or the index region of the database, and this type of application scenario may easily cause a single logical block address (LBA) to be over-read, leading to serious single page read disturbance. The read disturbance may affect the data correctness of a corresponding location in the upper or lower layer within a three-dimensional (3D) stacked structure of the flash memory. The erase level/state of the corresponding location may have a shift which may cause uncorrectable errors. In a situation where no error occurs in the page at the read location and there are many error bits in a physical location neighbor page, as the read location itself is not the error location, there is a need to efficiently detect the read disturbance errors.

Some suggestions may be proposed to try solving the problems described above, but addition problems such as some side effects may be introduced. For example, a first suggestion may be involved with performing data block refresh on a super block when detecting that a number of reading operations of the super block reaches a threshold. As data may be refreshed too frequently, the SSD may frequently start performing garbage collection (GC), causing low performance of the SSD. In another example, a second suggestion may be involved with performing data block refresh on a block when detecting that a number of reading operations of the block reaches a threshold, but a controller integrated circuit (IC) regarding this suggestion may need an external memory for storing associated records since the internal storage space of the controller IC is typically insufficient, and the records in the external memory must be updated for every reading operation. In addition, the single page read disturbance cannot be completely overcome, and the threshold may need to be set lower, causing a certain proportion of useless data refresh. Additionally, the above mechanism for performing data block refresh may lead to degraded performance in current and future high-stack 3D flash memory applications. It seems that there is no proper suggestion in the related art. Thus, a novel method and associated architecture are needed for solving the problems without introducing any side effect or in a way that is less likely to introduce a side effect.

SUMMARY OF THE INVENTION

It is an objective of the present invention to provide a method for performing read-disturbance detection of a memory device with the aid of hashing-based address mapping for data integrity control, and associated apparatus such as the memory device, an electronic device comprising the memory device, a memory controller within the memory device, etc., in order to solve the above-mentioned problems.

At least one embodiment of the present invention provides a method for performing read-disturbance detection of a memory device with the aid of hashing-based address mapping for data integrity control, where the method can be applied to a memory controller of the memory device. The memory device may comprise the memory controller and a non-volatile (NV) memory, and the NV memory may comprise at least one NV memory element (e.g., one or more NV memory elements). The method may comprise: establishing a read count table for recording multiple first read counts with respect to multiple first addresses, wherein the multiple first addresses belong to a first memory address space which is smaller than a second memory address space; performing the hashing-based address mapping on a set of second addresses at which reading operations are detected in order to convert the set of second addresses into a set of first addresses among the multiple first addresses, for updating a set of first read counts among the multiple first read counts with respect to the set of first addresses on the read count table, wherein the set of second addresses belong to the second memory address space; monitoring at least a highest first read count among the multiple first read counts on the read count table to determine whether the highest first read count reaches a first read count threshold; in response to the highest first read count reaching the first read count threshold, performing reverse mapping of the hashing-based address mapping on a first address at which the highest first read count is detected in order to convert the first address into all second addresses corresponding to the first address to be a set of target second addresses; and performing a media scan procedure with respect to the set of target second addresses, respectively, for maintaining data integrity of data in the NV memory.

In addition to the above method, the present invention also provides a memory controller for performing read-disturbance detection of a memory device with the aid of hashing-based address mapping for data integrity control, where the memory device comprises the memory controller and an NV memory. The NV memory may comprise at least one NV memory element (e.g., one or more NV memory elements). In addition, the memory controller comprises a processing circuit that is arranged to control the memory controller according to a plurality of host commands from a host device, to allow the host device to access the NV memory through the memory controller. More particularly, the memory controller may be arranged to establish a read count table for recording multiple first read counts with respect to multiple first addresses, wherein the multiple first addresses belong to a first memory address space which is smaller than a second memory address space; the memory controller may be arranged to perform the hashing-based address mapping on a set of second addresses at which reading operations are detected in order to convert the set of second addresses into a set of first addresses among the multiple first addresses, for updating a set of first read counts among the multiple first read counts with respect to the set of first addresses on the read count table, wherein the set of second addresses belong to the second memory address space; the memory controller may be arranged to monitor at least a highest first read count among the multiple first read counts on the read count table to determine whether the highest first read count reaches a first read count threshold; in response to the highest first read count reaching the first read count threshold, the memory controller may be arranged to perform reverse mapping of the hashing-based address mapping on a first address at which the highest first read count is detected in order to convert the first address into all second addresses corresponding to the first address to be a set of target second addresses; and the memory controller may be arranged to perform a media scan procedure with respect to the set of target second addresses, respectively, for maintaining data integrity of data in the NV memory.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the electronic device.

The method of the present invention and the associated apparatus can guarantee that the memory device can operate properly in various situations. For example, the memory controller within the memory device can operate according to at least one control scheme (e.g., one or more control schemes) of the method to perform associated operations, and more particularly, read respective physical location neighbor pages of the pages at the set of target second addresses to generate respective reading results thereof for determining whether the physical location neighbor pages are healthy, and determine any unhealthy physical location neighbor page among the physical location neighbor pages to be a read-disturbance-affected page, for being processed in advanced before the read-disturbance-affected page is damaged. The memory controller can write any partial data stored in the read-disturbance-affected page into a new page at a new second address for maintaining the data integrity of the data in the NV memory, and mark the read-disturbance-affected page as an invalid physical page to allow the read-disturbance-affected page to be damaged by further reading at any target second address, without degrading the data integrity of the data in the NV memory. In addition, the method of the present invention and the associated apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
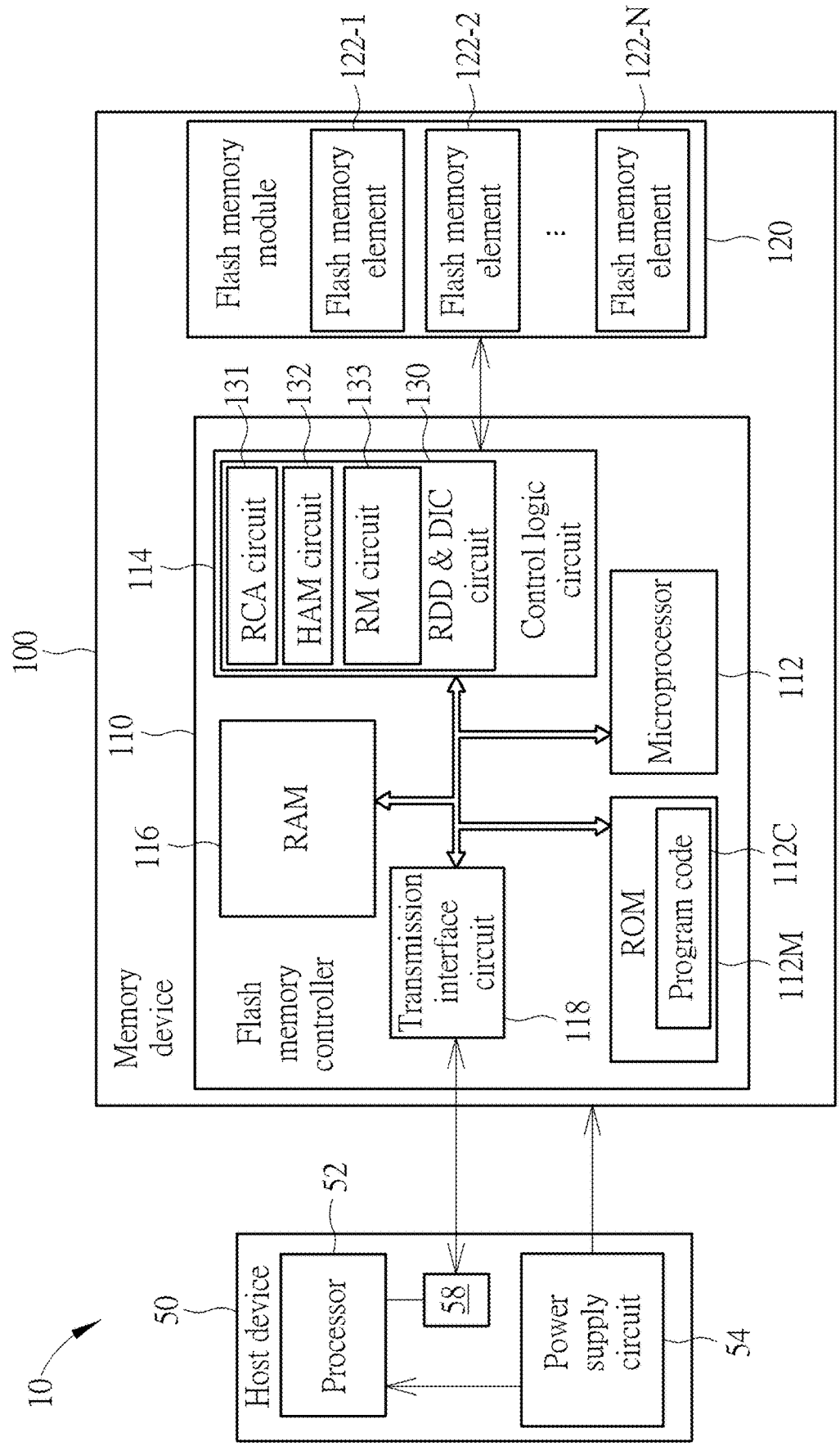
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, and may further comprise a power supply circuit 54 coupled to the processor 52. The processor 52 is arranged for controlling operations of the host device 50, and the power supply circuit 54 is arranged for providing power to the processor 52 and the memory device 100, and outputting one or more driving voltages to the memory device 100. The memory device 100 may be arranged for providing the host device 50 with storage space, and obtaining the one or more driving voltages from the host device 50 as power source of the memory device 100. Examples of the host device 50 may include, but are not limited to: a multifunctional mobile phone, a wearable device, a tablet computer, a personal computer such as a desktop computer and a laptop computer. Examples of the memory device 100 may include, but are not limited to: an SSD such as a PCIe SSD, and various types of embedded memory devices such as that conforming to PCIe specification, etc. According to this embodiment, the memory device 100 may comprise a memory controller such as a flash memory controller 110, and may further comprise an NV memory such as a flash memory, and the flash memory may be implemented as a flash memory module 120, where the flash memory controller 110 is arranged to control operations of the memory device 100 and access the flash memory module 120, and the flash memory module 120 is arranged to store information. The NV memory such as the flash memory module 120 may comprise at least one NV memory element (e.g., one or more NV memory elements) such as a plurality of flash memory elements 122-1, 122-2 . . . and 122-N, where "N" may represent a positive integer that is greater than one. For better comprehension, the plurality of flash memory elements 122-1, 122-2 . . . and 122-N may be implemented by way of flash memory chips or flash memory dies.

As shown in FIG. 1, the flash memory controller 110 may comprise a processing circuit such as a microprocessor 112, a storage unit such as a read-only memory (ROM) 112M, a control logic circuit 114, a random-access memory (RAM) 116 and a transmission interface circuit 118, where the above components may be coupled to one another via a bus. The RAM 116 is implemented by a Static RAM (SRAM), but the present invention is not limited thereto. The RAM 116 may be arranged to provide the flash memory controller 110 with internal storage space. For example, the RAM 116 may be utilized as a buffer memory for buffering data. In addition, the ROM 112M of this embodiment is arranged to store a program code 112C, and the microprocessor 112 is arranged to execute the program code 112C to control the access of the flash memory 120. In some examples, the program code 112C may be stored in the RAM 116 or any type of memory. Further, the control logic circuit 114 may be arranged to control the flash memory 120, and may comprise a read-disturbance detection (RDD) and data integrity control (DIC) circuit 130 (labeled "RDD & DIC circuit" for brevity) for performing data integrity control. The read-disturbance detection and data integrity control circuit 130 may comprise a read count adder (RCA) circuit 131, a hashing-based address mapping (HAM) circuit 132, a reverse mapping (RM) circuit 133 and other circuits. The transmission interface circuit 118 may conform to one or more communications specifications among various communications specifications (e.g., Serial Advanced Technology Attachment (Serial ATA, or SATA) specification, Universal Serial Bus (USB) specification, Peripheral Component Interconnect (PCI) specification, PCIe specification, embedded Multi Media Card (eMMC) specification, and Universal Flash Storage (UFS) specification), and may perform communications with the host device 50 (or a corresponding transmission interface circuit therein such as the transmission interface circuit 58) according to the one or more communications specifications for the memory device 100. Similarly, the transmission interface circuit 58 may conform to the one or more communications specifications, and may perform communications with the memory device 100 (or the transmission interface circuit 118 therein) according to the one or more communications specification for the host device 50.

In this embodiment, the host device 50 may transmit host commands and corresponding logical addresses to the flash memory controller 110 to access the memory device 100. The flash memory controller 110 receives the host commands and the logical addresses, and translates the host commands into memory operating commands (which may be simply referred to as operating commands), and further controls the flash memory module 120 with the operating commands to perform reading, writing/programing, etc. on memory units (e.g., data pages) having physical addresses within the flash memory module 120, where the physical addresses can be associated with the logical addresses. When the flash memory controller 110 performs an erase operation on any flash memory element 122-$n$ among the plurality of flash memory elements 122-1, 122-2 . . . and 122-N (in which "n" may represent any integer in the interval [1, N]), at least one block of multiple blocks of the flash memory element 122-$n$ may be erased, where each block of the blocks may comprise multiple pages (e.g., data pages), and an access operation (e.g., a reading operation or a writing operation) may be performed on one or more pages.

Figure 2:
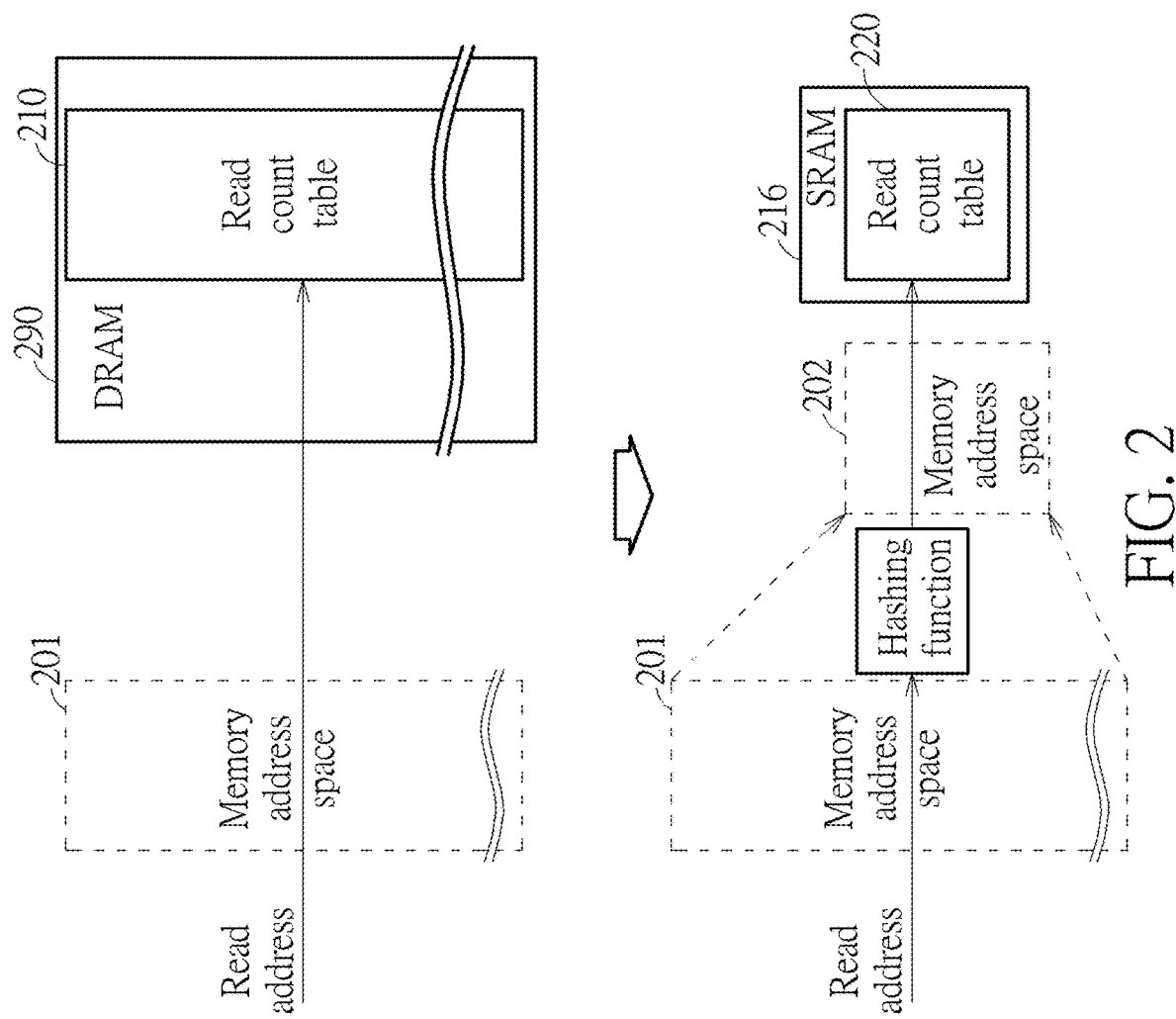
FIG. 2 illustrates, in the lower half part thereof, an address hashing and table shrinking control scheme of a method for performing read-disturbance detection of a memory device with the aid of hashing-based address mapping for data integrity control according to an embodiment of the present invention, where a non-address-hashing-based huge table control scheme is illustrated in the upper half part of FIG. 2 for better comprehension.

FIG. 2 illustrates, in the lower half part thereof, an address hashing and table shrinking control scheme of a method for performing read-disturbance detection of a memory device with the aid of hashing-based address mapping for data integrity control according to an embodiment of the present invention, where a non-address-hashing-based huge table control scheme is illustrated in the upper half part of FIG. 2 for better comprehension. Assume that one or more functions of the memory device 100 may be temporarily disabled to allow the flash memory controller 110 and the flash memory module 120 to operate according to the non-address-hashing-based huge table control scheme shown in the upper half part of FIG. 2, but the present invention is not limited thereto. For example, the flash memory controller 110 may be configured to perform data block refresh on a super block (e.g., a combination of blocks across different channels and/or across different flash memory chips/dies) when detecting that a read count (e.g., a number of reading operations) of the super block reaches a threshold. Assuming that there are 256 super blocks and the read count of each super block is recorded using four bytes, a table of one kilobyte (KB) is required. However, such records in the 1 KB table may be too inaccurate and may cause data to be refreshed too frequently, and therefore the memory device 100 may frequently start performing GC, causing low performance of the memory device 100. In order to have more accurate records, the flash memory controller 110 may be configured to perform data block refresh on a block when detecting that a read count (e.g., a number of reading operations) of the block reaches a threshold. Taking an enterprise-class SSD as an example, assuming that there are 2048 blocks per logical unit number (LUN) and there are 128 LUNs, and that the read count of each block is recorded using four bytes, a huge table of one megabyte (MB) is required. Such storage space of the 1 MB table typically requires the use of a dynamic RAM (DRAM), and the huge table must be updated for every reading operation. Even if the huge table is used, the single page read disturbance cannot be completely overcome. As the flash memory module 120 may be more susceptible to be damaged by the single page read disturbance than the full block sequential read, the threshold should be set lower, causing a certain proportion of useless data refresh.

Based on the non-address-hashing-based huge table control scheme, the flash memory controller 110 may establish the huge table such as a read count table 210 with respect to multiple physical addresses (e.g., the physical addresses of the NV memory such as the flash memory module 120, accessible by the flash memory controller 110), needing a huge storage space for storing the huge table such as the read count table 210. As mentioned above, the RAM 116 within the flash memory controller 110 is typically implemented by the SRAM such as an SRAM 216, and it is typically not affordable to prepare the huge storage space within the flash memory controller 110. When adopting the non-address-hashing-based huge table control scheme, the memory device 100 may be forced to further comprise an external memory of the flash memory controller 110, such as a DRAM 290 outside the flash memory controller 110, for providing the huge storage space mentioned above, causing the associated costs such as the material cost, the labor costs, etc. to be increased.

As shown in the lower half part of FIG. 2, the flash memory controller 110 may operate according to the address hashing and table shrinking control scheme, to shrink the huge table to be a much smaller table such as a read count table 220 stored in the RAM 116 such as the SRAM 216, in order to achieve a better overall performance. More particularly, the flash memory controller 110 may refer to a first memory address space 202 rather than a second memory address space 201 to maintain the read count table 220 for performing the read-disturbance detection, where multiple second addresses belonging to the second memory address space 201 may represent the multiple physical addresses of the NV memory such as the flash memory module 120 that are accessible by the flash memory controller 110. In addition, the flash memory controller 110 may perform a reading operation on the flash memory module 120 at any second address among the multiple second addresses. In response to the aforementioned any second address at which the reading operation is performed (labeled "Read address" for brevity), the flash memory controller 110 may perform address conversion from the second memory address space 201 to the first memory address space 202 for updating the read count table 220, in order to perform the read-disturbance detection according to the read count table 220. For example, the associated operations may comprise:

(1) the flash memory controller 110 may establish the read count table 220 for recording multiple first read counts {RC} with respect to multiple first addresses, with the multiple first addresses belonging to the first memory address space 202 which is smaller than the second memory address space 201;

(2) the flash memory controller 110 may perform the hashing-based address mapping on a set of second addresses at which reading operations are detected in order to convert the set of second addresses into a set of first addresses among the multiple first addresses, for updating a set of first read counts {RC} among the multiple first read counts {RC} with respect to the set of first addresses on the read count table 220, where the set of second addresses belong to the second memory address space 201, for example, the multiple second addresses may comprise the set of second addresses, and the set of second addresses may be regarded as a sub-set of the multiple second addresses;

(3) the flash memory controller 110 may monitor at least a highest first read count RC among the multiple first read counts {RC} on the read count table 220 to determine whether the highest first read count RC reaches a first read count threshold $RC_{THRESHOLD}$;

(4) in response to the highest first read count RC reaching the first read count threshold $RC_{THRESHOLD}$, the flash memory controller 110 may perform reverse mapping of the hashing-based address mapping on a first address at which the highest first read count RC is detected in order to convert the first address into all second addresses corresponding to the first address, such as all second addresses mapped to the first address in the hashing-based address mapping, to be a set of target second addresses; and (5) the flash memory controller 110 may perform a media scan procedure with respect to the set of target second addresses, respectively, for maintaining data integrity of data in the NV memory; where the multiple first addresses belonging to the first memory address space 202 may be implemented as a portion of second addresses among the multiple second addresses belonging to the second memory address space 201, but the present invention is not limited thereto.

When operating according to the address hashing and table shrinking control scheme, the flash memory controller 110 may record the multiple first read counts {RC} with respect to the multiple first addresses on the read count table 220, having no need to record multiple second read counts {RC'} with respect to the multiple second addresses on the huge table such as the read count table 210. In addition, the flash memory controller 110 may monitor at least the highest first read count RC among the multiple first read counts {RC} on the read count table 220 to determine whether the highest first read count RC reaches the first read count threshold $RC_{THRESHOLD}$, having no need to monitor any highest second read count RC' among the multiple second read counts {RC'} on the huge table such as the read count table 210 to determine whether the highest second read count RC' reaches any second read count threshold $RC_{THRESHOLD}'$. For example, the flash memory controller 110 may convert the set of second addresses into the set of first addresses among the multiple first addresses with a hashing function, and may convert the first address into the aforementioned all second addresses corresponding to the first address with a reverse hashing function. The hashing function may be implemented as a many-to-one function such as a modulo function for performing the hashing-based address mapping, and the reverse hashing function may be implemented as a multivalued function for performing the reverse mapping, but the present invention is not limited thereto. In some examples, the hashing function and the reverse hashing function may vary. According to some embodiments, the hashing-based address mapping may represent a first mapping for mapping any group of inputs among multiple groups of inputs of the first mapping into a same output among multiple outputs of the first mapping, and the reverse mapping may represent a second mapping for mapping any input among multiple inputs of the second mapping into a same group of outputs among multiple groups of outputs of the second mapping. For example, the first mapping may be implemented by way of the many-to-one function such as the modulo function, and the second mapping may be implemented by way of the multivalued function.

Figure 3:
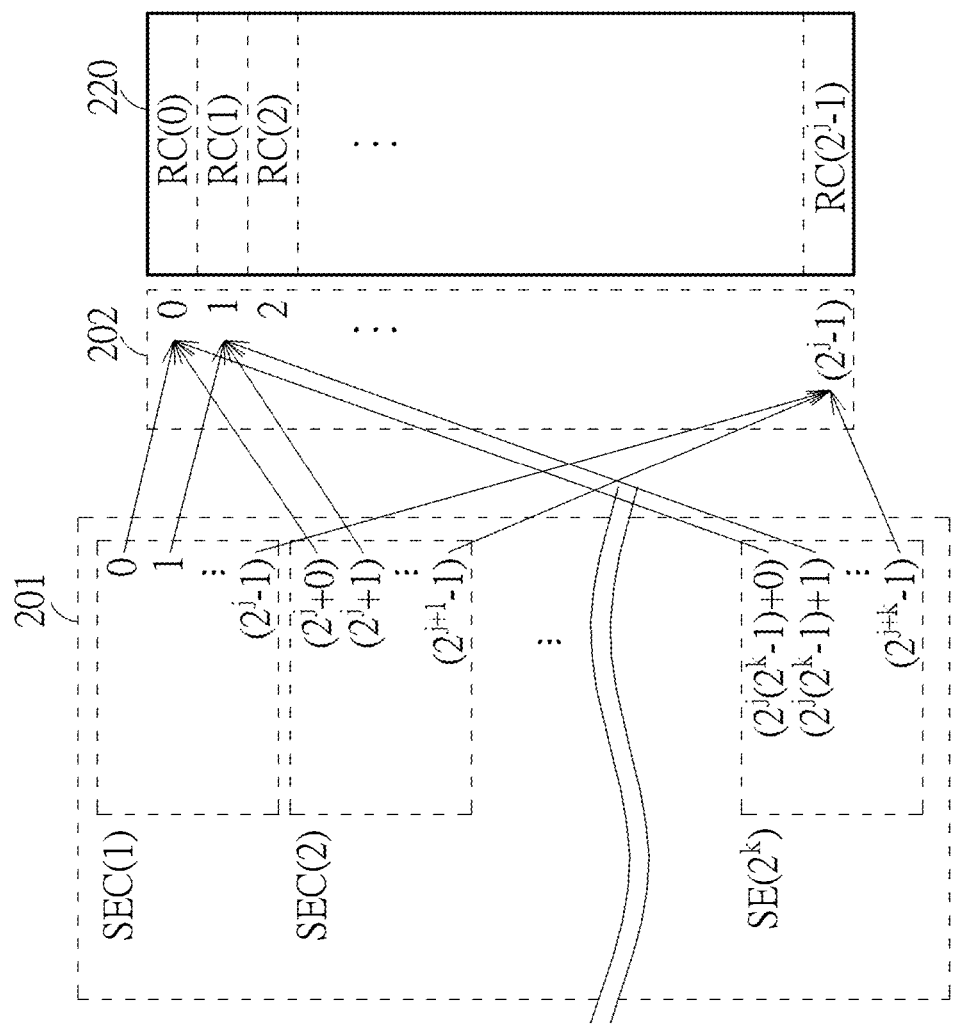
FIG. 3 illustrates a series of address hashing operations involved with the address hashing and table shrinking control scheme shown in FIG. 2 according to an embodiment of the present invention.

FIG. 3 illustrates a series of address hashing operations involved with the address hashing and table shrinking control scheme shown in FIG. 2 according to an embodiment of the present invention, where multiple sections of addresses, the associated hashed addresses and the associated read count table entries may be illustrated for better comprehension. Assuming that "m", "j" and "k" may be positive integers and m=(j+k), the multiple second addresses (e.g., the multiple physical addresses) belonging to the second memory address space 201 may comprise $2^m$ second addresses, and may be divided into $2^k$ sections of addresses {SEC(1), SEC(2), . . . , SEC($2^k$)}, and the multiple first addresses (e.g., the hashed addresses) belonging to the first memory address space 202 may comprise $2^j$ first addresses such as the $2^j$ addresses {0, 1, . . . , ($2^j$−1)}. Taking the modulo function as an example of the hashing function, the flash memory controller 110 may perform the hashing-based address mapping for converting the multiple second addresses belonging to the second memory address space 201 into the multiple first addresses belonging to the first memory address space 202 as illustrated with the arrows shown in FIG. 3. More particularly, the multiple sections of addresses mentioned above, such as the $2^k$ sections of addresses {SEC(1), SEC(2), . . . , SEC($2^k$)} among the multiple second addresses belonging to the second memory address space 201, may comprise the addresses {{0, 1, . . . , ($2^j$−1)}, {($2^j$+0), ($2^j$+1), . . . , ($2^{j+1}$−1)}, . . . , {(($2^{j*}(2^k$−1))+0), (($2^{j*}(2^k$−1))+1), . . . , ($2^{j+k}$−1)}} (in which "($2^{j*}(2^k$−1))" may be written as "2 ($2^k$−1)" for brevity), respectively, the associated hashed addresses belonging to the first memory address space 202 may comprise the $2^j$ addresses {0, 1, . . . , ($2^j$−1)}, and the associated read count table entries may comprise the $2^j$ read count table entries respectively corresponding to the $2^j$ addresses {0, 1, . . . , ($2^j$−1)}, such as the first read counts {RC(0), RC(1), RC(2), . . . , RC($2^j$−1)} (or "the read counts {RC(0), RC(1), RC(2), . . . , RC($2^j$−1)}") recorded with respect to the addresses {0, 1, 2, . . . , ($2^j$−1)} by the flash memory controller 110. For brevity, similar descriptions for this embodiment are not repeated in detail here.

According to some embodiments, m=29, j=16 and k=13, but the present invention is not limited thereto. According to some embodiments, m, j and k may vary, and more particularly, may be equal to any other set of fixed values differing from the set of fixed values (m=29, j=16, k=13) described above. For brevity, similar descriptions for these embodiments are not repeated in detail here.

Figure 4:
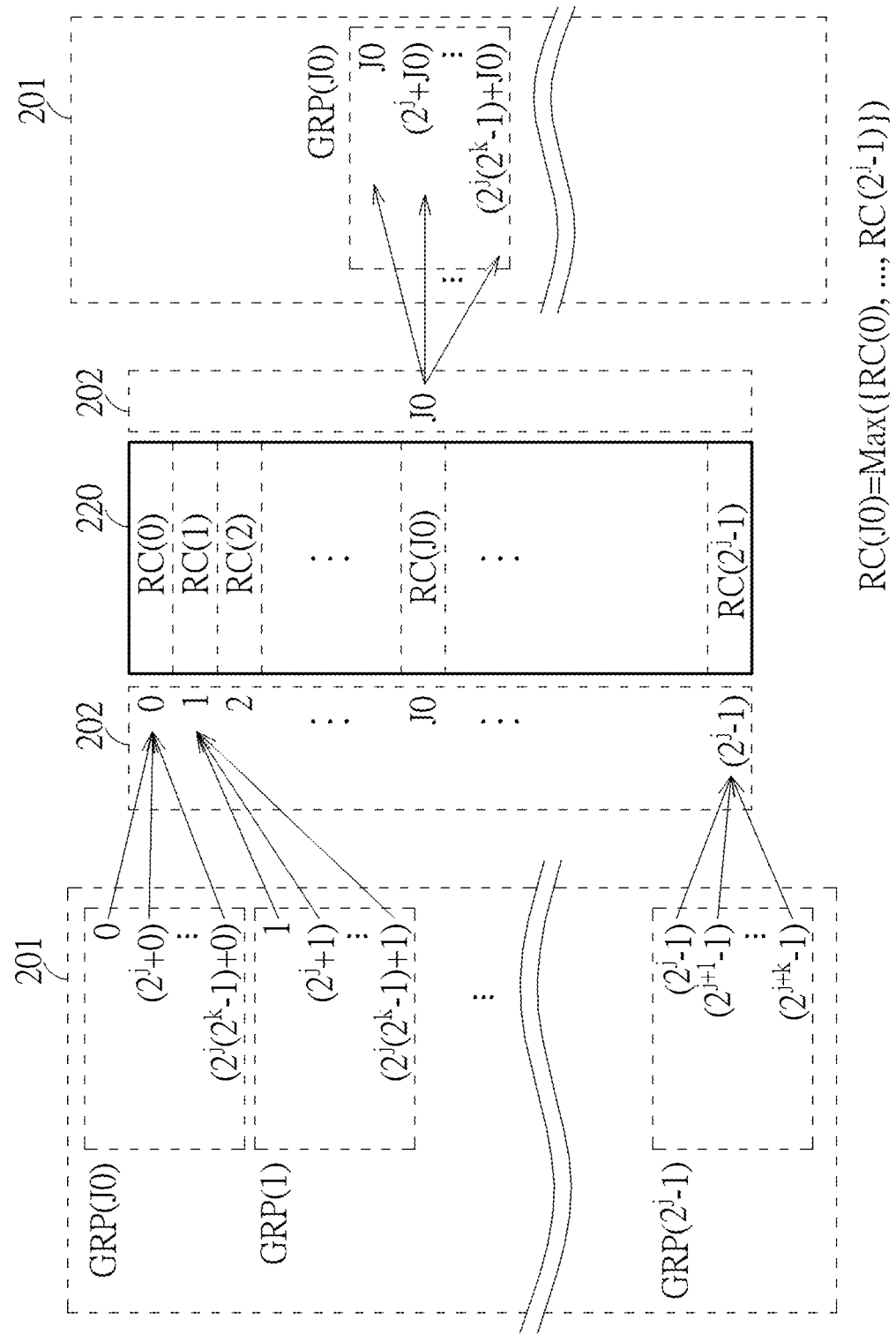
FIG. 4 illustrates a hashing-based address mapping and reverse mapping control scheme of the method according to an embodiment of the present invention.

FIG. 4 illustrates a hashing-based address mapping and reverse mapping control scheme of the method according to an embodiment of the present invention. The flash memory controller 110 may perform the hashing-based address mapping such as the first mapping for mapping any group of inputs GRP( ) among the multiple groups of inputs {GRP(0), GRP(1), . . . , GRP($2^j$−1)} (e.g., the $2^j$ groups of addresses {{0, ($2^j$+0), . . . , (($2^{j*}(2^k$−1))+0)}, {1, ($2^j$+1), . . . , (($2^{j*}(2^k$−1))+1)}, . . . , {($2^j$−1), ($2^{j+1}$−1), . . . , ($2^{j+k}$−1)}} in the second memory address space 201, where "($2^{j*}(2^k$−1))" may be written as "$2^j(2^k$−1)" for brevity) of the first mapping into the same output among the multiple outputs of the first mapping, such as one of the $2^j$ addresses {0, 1, . . . , ($2^j$−1)} in the first memory address space 202, and perform the reverse mapping such as the second mapping for mapping any input (e.g., the address J) among the multiple inputs (e.g., the addresses {J|J=J0, J1, . . . , J(NRC_top_group−1)} in the first memory address space 202, with the addresses {J0, J1, . . . , J(NRC_top_group−1)} being a subset of the $2^j$ addresses {0, 1, . . . , ($2^j$−1)}, denoted by "{J0, J1, . . . , J(NRC_top_group−1)}⊆{0, 1, . . . , ($2^j$−1)}") of the second mapping into the same group of outputs GRP(J) among the multiple groups of outputs {GRP(J)|J=J0, J1, . . . , J(NRC_top_group−1); {J0, J1, . . . , J(NRC_top_group−1)}⊆{0, 1, . . . , ($2^j$−1)}} of the second mapping. According to some viewpoints, the multiple groups of inputs {GRP(0), GRP(1), . . . , GRP($2^j$−1)} and the group of inputs GRP( ) may also be referred to as the multiple groups of addresses {GRP(0), GRP(1), . . . , GRP($2^j$−1)} and the group of addresses GRP( ) respectively, and the multiple groups of outputs {GRP(J)|J=J0, J1, . . . , J(NRC_top_group−1); {J0, J1, . . . , J(NRC_top_group−1)}⊆{0, 1, . . . , ($2^j$−1)}} and the group of outputs GRP(J) may also be referred to as the multiple groups of addresses {GRP(J)|J=J0, J1, . . . , J(NRC_top_group−1); {J0, J1, . . . , J(NRC_top_group−1)}⊆{0, 1, . . . , ($2^j$−1)}} and the group of addresses GRP(J), respectively.

As shown in FIG. 4, the read count RC(J0) may be equal to the maximum (or max) value Max({RC(0), RC(1), . . . , RC($2^j$−1)}) of the read counts {RC(0), RC(1), . . . , RC($2^j$−1)} (labeled "RC(J0)=Max({RC(0), . . . , RC($2^j$−1)})" in which "Max( )" may stand for the maximum function), and therefore may be referred to as the highest read count RC(J0), and the read counts {RC(J)|J=J0, J1, . . . , J(NRC_top_group−1); {J0, J1, . . . , J(NRC_top_group−1)}≤{0, 1, . . . , ($2^j$−1)}} may represent the top NRC_top_group read counts, where RC(J0)>RC(J1)> . . . >RC(NRC_top_group−1). For example, when NRC_top_group=20, the top NRC_top_group read counts may be the top twenty read counts, but the present invention is not limited thereto. In some examples, the number NRC_top_group of read counts in the top NRC_top_group read counts may vary, and more particularly, may be equal to any other value (e.g., one of the values among the interval [1, $2^j$]). Additionally, any group of outputs GRP(J) among the multiple groups of outputs {GRP(J)|J=J0, J1, . . . , J(NRC_top_group−1); {J0, J1, . . . , J(NRC_top_group−1)}⊆{0, 1, . . . , ($2^j$−1)}} of the second mapping may comprise the $2^k$ addresses {J, ($2^j$+J), . . . , (($2^{j*}(2^k$−1))+J)}. For example, when J=J0, the group of outputs GRP(J0) may comprise the $2^k$ addresses {J0, ($2^j$+J0), . . . , (($2^{j*}(2^k$−1))+J0)}; when J=J1, the group of outputs GRP(J1) may comprise the $2^k$ addresses {J1, ($2^j$+J1), . . . , (($2^{j*}(2^k$−1))+J1)}; and the rest may be deduced by analogy. For brevity, similar descriptions for this embodiment are not repeated in detail here.

Some implementation details regarding the reverse mapping of the hashing-based address mapping may be described as follows. According to some embodiments, the address J0 may be one of the $2^j$ addresses {0, 1, . . . , ($2^j$−1)} in the first memory address space 202. If J0=0, the $2^k$ addresses {J0, ($2^j$+J0), . . . , (($2^{j*}(2^k$−1))+J0)} in the group of outputs GRP(J0=0) may be rewritten as the addresses {0, ($2^j$+0), . . . , (($2^{j*}(2^k$−1))+0)}, which is equal to the addresses {0, ($2^j$+0), . . . , (($2^{j*}(2^k$−1))+0)} in the group of inputs GRP(0), indicating the reverse mapping of the case of J0=0; if J0=1, the $2^k$ addresses {J0, ($2^j$+J0), . . . , (($2^{j*}(2^k$−1))+J0)} in the group of outputs GRP(J0=1) may be rewritten as the addresses {1, ($2^j$+1), . . . , (($2^{j*}(2^k$−1))+1)}, which is equal to the addresses {1, ($2^j$+1), . . . , (($2^{j*}(2^k$−1))+1)} in the group of inputs GRP(1), indicating the reverse mapping of the case of J0=1; . . . ; and if J0=($2^j$−1), the $2^k$ addresses {J0, ($2^j$+J0), . . . , (($2^{j*}(2^k$−1))+J0)} in the group of outputs GRP(J0=($2^j$−1)) may be rewritten as the addresses {($2^j$−1), ($2^k$+($2^j$−1)), . . . , (($2^{j*}(2^k$−1))+($2^j$−1))} or the addresses {($2^j$−1), ($2^{j+1}$−1), . . . , ($2^{j+k}$−1)}, which is equal to the addresses {($2^j$−1), ($2^{j+1}$−1), . . . , ($2^{j-k}$−1)} in the group of inputs GRP($2^j$−1), indicating the reverse mapping of the case of J0=($2^j$−1). For brevity, similar descriptions for these embodiments are not repeated in detail here.

In the embodiment shown in FIG. 4, the address hashing operations may be illustrated in a group-by-group manner for indicating the relationship(s) between the hashing-based address mapping and the reverse mapping, but the present invention is not limited thereto. As the multiple second addresses (e.g., the multiple physical addresses) may increase starting from a beginning address in the second memory address space 201, the multiple second addresses belonging to the second memory address space 201 should be arranged in the order such as that shown in FIG. 3, and the address hashing operations applied to the multiple second addresses should be arranged as illustrated with the arrows shown in FIG. 3, where the $2^k$ sections of addresses {SEC(1), SEC(2), ..., SEC($2^k$)} belonging to the second memory address space 201 may be hashed by the flash memory controller 110 to generate the associated hashed addresses such as the 21 addresses {0, 1, ..., ($2^j$−1)} belonging to the first memory address space 202.

Figure 5:
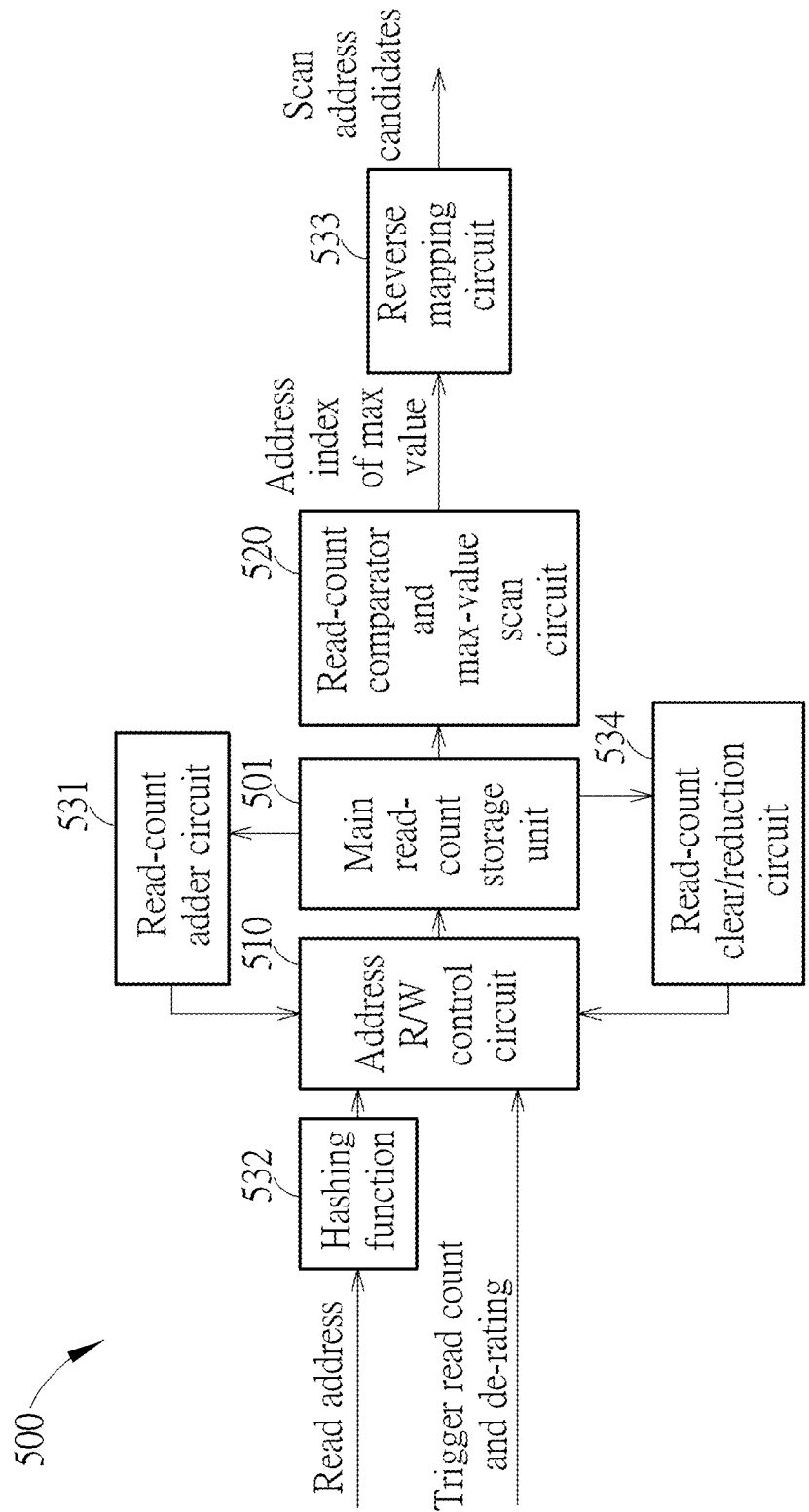
FIG. 5 illustrates a scan location generator involved with the method according to an embodiment of the present invention.

FIG. 5 illustrates a scan location generator 500 involved with the method according to an embodiment of the present invention. The scan location generator 500 may be implemented within the flash memory controller 110 shown in FIG. 1, and may comprise a main read-count storage unit 501, an address read/write (R/W) control circuit 510 (labeled "Address R/W control circuit" for brevity), a read-count comparator and max-value scan circuit 520, a read-count adder circuit 531, a hashing function circuit 532, a reverse mapping circuit 533 and a read-count clear/reduction circuit 534. More particularly, the main read-count storage unit 501 may be implemented by way of a storage region within the RAM 116, and the other components within the scan location generator 500 shown in FIG. 5 may be integrated into the read-disturbance detection and data integrity control circuit 130 shown in FIG. 1, where the read-count adder circuit 531, the hashing function circuit 532 and the reverse mapping circuit 533 may be taken as examples of the read count adder circuit 131, the hashing-based address mapping circuit 132 and the reverse mapping circuit 133 shown in FIG. 1, respectively.

The main read-count storage unit 501 may be configured to store the read count table 220, and the address read/write control circuit 510 may be configured to perform address read/write control on the main read-count storage unit 501. In addition, the read-count comparator and max-value scan circuit 520 may be configured to obtain at least one portion of read counts {RC} (e.g., a portion of read counts {RC} or all read counts {RC}) among the read counts {RC(0), RC(1), ..., RC($2^j$−1)} from the read count table 220 in the main read-count storage unit 501 to perform read-count comparison and read-count maximum value scanning for finding out at least the maximum value such as the highest read count RC(J0) (e.g., the maximum value Max({RC(0), RC(1), ..., RC($2^j$−1)}) of the read counts {RC(0), RC(1), ..., RC($2^j$−1)}), in order to output an address index of the max value, such as the address J0, but the present invention is not limited thereto. During the read-count comparison and read-count maximum value scanning, the read-count comparator and max-value scan circuit 520 may also find out the top NRC_top_group read counts {RC(J) |J=J0, J1, ..., J(NRC_top_group−1); {J0, J1, ..., J(NRC_top_group−1)}⊆{0, 1, ..., ($2^j$−1)}} (e.g., the top twenty read counts {RC(J)|J=J0, J1, ..., J19} when NRC_top_group=20), in order to output the address index (e.g., the address J) of any read count RC(J) among the top NRC_top_group read counts {RC(J)|J=J0, J1, ..., J(NRC_top_group−1); {J0, J1, ..., J(NRC_top_group−1)}⊆{0, 1, ..., ($2^j$−1)}}, for performing the reverse mapping with the reverse mapping circuit 533 to convert the address index such as the address J into the $2^k$ addresses {J, ($2^j$+J), ..., (($2^j$*($2^k$−1))+J)}.

As shown in FIG. 5, the read-count adder circuit 531 and the hashing function circuit 532 may be coupled to the main read-count storage unit 501 to access (e.g., read or write) the main read-count storage unit 501 in order to update the read count table 220 stored in the main read-count storage unit 501. For example, the read-count adder circuit 531 may be configured to perform read-count adding or accumulating operations for accumulating the read counts {RC(0), RC(1), ..., RC($2^j$−1)}, respectively. In addition, the hashing function circuit 532 may be configured to provide the hashing function for performing the hashing-based address mapping from the second memory address space 201 to the first memory address space 202, in order to hash a read address (e.g., a read physical address such as the physical address at which a reading operation is performed) in the second memory address space 201 to generate a hashed address in the first memory address space 202. In response to the reading operation at the read address and/or the reception of the read address, the hashing function circuit 532 may convert the read address in the second memory address space 201 into the hashed address such as a corresponding address among the addresses {0, ..., ($2^j$−1)} in the first memory address space 202, and the address read/write control circuit 510 may update the read count table 220 in the main read-count storage unit 501, and more particularly, update the read count RC corresponding to the hashed address (e.g., the corresponding address among the addresses {0, ..., ($2^j$−1)}) on the read count table 220 with the aid of the read-count adder circuit 531, to make the read count RC be increased with a predetermined increment such as one. As time goes by, one or more read counts {RC} such as the aforementioned at least one portion of read counts {RC} among the read counts {RC(0), RC(1), ..., RC($2^j$−1)} may increase, respectively, and the read-count comparator and max-value scan circuit 520 may perform the read-count comparison and read-count maximum value scanning to output the address index (e.g., any address J among the addresses {J|J=J0, J1, ..., J(NRC_top_group−1)}). The reverse mapping circuit 533 may be configured to perform the reverse mapping of the hashing-based address mapping, in order to map or convert the address index such as the address J into a group of scan address candidates such as the $2^k$ addresses {J, ($2^j$+J), ..., (($2^j$*($2^k$−1))+J)}. For example, when J=J0, the reverse mapping circuit 533 may perform the reverse mapping to map or convert the address index such as the address J0 into the group of scan address candidates such as the addresses {J0, ($2^j$+J0), ..., (($2^j$*($2^k$−1))+J0)}. When there is a need, the read-count clear/reduction circuit 534 may be configured to perform read-count clear or reduction operations for selectively clear the highest read count RC(J0) or reduce the highest read count RC(J0) in order to de-rate (or derate) the read count RC(J0), for lowering the rated read-disturbance metric (e.g., the metric of read disturbance) indicated by the read count RC(J0). Additionally, the external system (e.g., the system implemented as the system program code running on the microprocessor 112) of the scan location generator 500 may selectively trigger the read-count adding/accumulating operations or the read-count clear/reduction operations (labeled "Trigger read count and de-rating" for better comprehension). For brevity, similar descriptions for this embodiment are not repeated in detail here.

Figure 6:
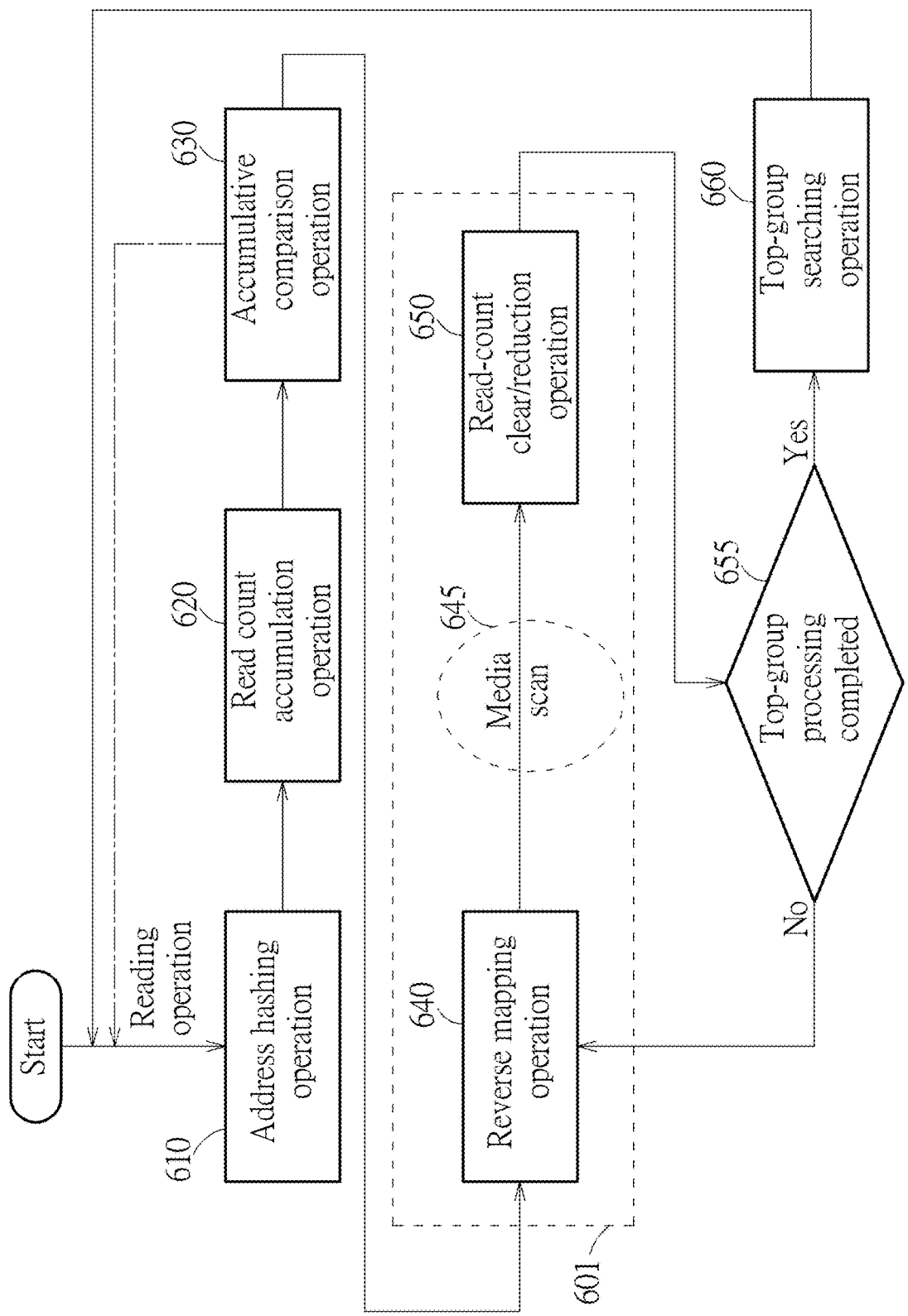
FIG. 6 illustrates a read count screening and scan location generation control scheme of the method according to an embodiment of the present invention.

FIG. 6 illustrates a read count screening and scan location generation control scheme of the method according to an embodiment of the present invention. For example, the scan location generator 500 within the flash memory controller 110 may operate according to the read count screening and scan location generation control scheme, and the associated operations may comprise:

(1) in an address hashing operation 610, the scan location generator 500 may receive the read address (e.g., the read physical address such as the physical address at which the reading operation is performed) to be the input signal of the hashing function circuit 532, in order to map the read address in the second memory address space 201 to the hashed address (e.g., the aforementioned corresponding address among the addresses $\{0, \ldots, (2^j-1)\}$) in the first memory address space 202 through the hashing function of the hashing function circuit 532;

(2) in a read count accumulation operation 620, the scan location generator 500 (or the read-count adder circuit 531 therein) may read the read count RC corresponding to the hashed address (e.g., the corresponding address among the addresses $\{0, \ldots, (2^j-1)\}$) from the read count table 220 stored in the main read-count storage unit 501 and increase the read count RC with the predetermined increment such as one, in order to make the read count RC in the read count table 220 be updated with an increment operator (e.g., RC++);

(3) in an accumulative comparison operation 630, the scan location generator 500 (or the read-count comparator and max-value scan circuit 520 therein) may obtain the accumulated read counts {RC}, such as the aforementioned at least one portion of read counts {RC} among the read counts {RC(0), RC(1), ..., RC($2^j-1$)} from the main read-count storage unit 501 to perform real-time calculation and comparison, and record the top NRC_top_group read counts {RC(J) |J=J0, J1, . . . , J(NRC_top_group−1); {J0, J1, . . . , J(NRC_top_group−1)}⊆{0, 1, . . . , ($2^j-1$)}} (e.g., the top twenty read counts {RC(J)|J=J0, J1, . . . , J19}, for the case of NRC_top_group=20) as well as their address index such as the associated addresses {J0, J1, . . . , J(NRC_top_group−1)} (e.g., the addresses {J0, J1, . . . , J19}, for the case of NRC_top_group=20) in the first memory address space 202 into a storage unit such as a register circuit within the scan location generator 500, where a partial working flow comprising the address hashing operation 610, the read count accumulation operation 620 and the accumulative comparison operation 630 may be performed multiple times for multiple reading operations as illustrated with the arrow depicted with dashed lines, and after comparing the read count accumulation results such as the aforementioned at least one portion of read counts {RC}, the read-count comparator and max-value scan circuit 520 may output the address index (e.g., the address J) of the aforementioned any read count RC(J) among the top NRC_top_group read counts {RC(J)|J=J0, J1, . . . , J(NRC_top_group−1); {J0, J1, . . . , J(NRC_top_group−1)}⊆{0, 1, . . . , ($2^j-1$)}}, such as the address J0 associated with the highest read count RC(J0) for the case of J=J0, to the reverse mapping circuit 533;

(4) under control of the external system (or the system running on the microprocessor 112) of the scan location generator 500, in a reverse mapping operation 640, the scan location generator 500 (or the reverse mapping circuit 533 therein) may perform the reverse mapping in order to map or convert the address index such as the address J into the group of scan address candidates such as the $2^k$ addresses {J, ($2^j$+J), . . . , (($2^{j*}(2^k-1))$+J)} (e.g., the addresses {J0, ($2^j$+J0), . . . , (($2^{j*}(2^k-1))$+J0)} for the case of J=J0) to be a set of target second addresses in the second memory address space 201, for performing the aforementioned media scan procedure such as the media scan procedure 645 (labeled "Media scan" for brevity), where the $2^k$ addresses {J, ($2^j$+J), . . . , (($2^{j*}(2^k-1))$+J)} may represent the physical addresses at which the read disturbance is likely to occur, and for J=J0, the $2^k$ addresses {J0, ($2^j$+J0), . . . , (($2^{j*}(2^k-1))$+J0)} may represent the physical addresses at which the read disturbance is most likely to occur;

(5) after the external system (or the system running on the microprocessor 112) of the scan location generator 500 triggers the media scan procedure 645, in a read-count clear/reduction operation 650, the scan location generator 500 (or the address read/write control circuit 510, with the aid of the read-count clear/reduction circuit 534) may update the read count RC(J) (e.g., the highest read count RC(J0) for the case of J=J0) according to the error status (e.g., error bit number/counts, or "the error counts" for brevity) of the media scan procedure 645 to selectively reset the read count RC(J) to zero or reduce the read count RC(J), where the flash memory controller 110 (or the system running on the microprocessor 112) may perform a top-group processing completeness checking operation 655 for determining whether the top-group processing 601 (which may comprise the reverse mapping operation 640, the media scan procedure 645 and the read-count clear/reduction operation 650) corresponding to the top NRC_top_group read counts {RC(J)|J=J0, J1, . . . , J(NRC_top_group−1); {J0, J1, . . . , J(NRC_top_group−1)}⊆{0, 1, . . . , ($2^j-1$)}} is completed (labeled "Top-group processing completed" for brevity), in order to repeat the top-group processing 601 for the next read count RC(J+1) of the current read count RC(J); and (6) after the top-group processing 601 for each read count RC(J) among the top NRC_top_group read counts {RC(J)|J=J0, J1, . . . , J(NRC_top_group−1); {J0, J1, . . . , J(NRC_top_group−1)}⊆{0, 1, . . . , ($2^j-1$)}} is completed, in a top-group searching operation 660, the flash memory controller 110 (or the system running on the microprocessor 112) may read the latest read counts {RC(0), RC(1), . . . , RC($2^j-1$)} in the read count table 220 to search for the latest top NRC_top_group read counts {RC(J)|J=J0, J1, . . . , J(NRC_top_group−1); {J0, J1, . . . , J(NRC_top_group−1)}⊆{0, 1, . . . , ($2^j-1$)}}, in order to continue with the associated operations, for maintaining the data integrity of the data in the NV memory such as the flash memory module 120;

where the flash memory controller 110 may perform the media scan procedure 645 to test the respective physical location neighbor pages of the pages at the set of target second addresses obtained in the reverse mapping operation 640, but the present invention is not limited thereto. In some embodiments, the architecture of the flash memory controller 110 shown in FIG. 1, the architecture of the scan location generator 500 shown in FIG. 5, one or more partial working flows of the working flow shown in FIG. 6 and/or the associated operations may vary. According to some viewpoints, the read-count adder circuit 531 may be regarded as an accumulative adder, and the read-count comparator and max-value scan circuit 520 may be regarded as an accumulative comparator. For brevity, similar descriptions for this embodiment are not repeated in detail here.

Some implementation details of the read count screening and scan location generation control scheme may be further described as follows. According to some embodiments, the flash memory controller 110 (or the system running on the microprocessor 112) may determine the physical location neighbor page health to perform data protection in advance, in order to prevent the data in the flash memory module 120 from being damaged by the read disturbance, for maintaining the data integrity of the data. When performing the media scan procedure 645 to test the respective physical location neighbor pages of the pages at the set of target second addresses obtained in the reverse mapping operation 640, such as the respective physical location neighbor pages $\{PAGE_{NEIGHBOR}(J_{TARGET})\}$ of the pages $\{PAGE_{TARGET}(J_{TARGET})\}$ at the set of target second addresses $\{J_{TARGET}\}$ (e.g., the $2^k$ addresses $\{J, (2^j+J), \ldots, ((2^{j*}(2^k-1))+J)\}$ determined in the reverse mapping operation 640), the flash memory controller 110 may read at least one physical location neighbor page $PAGE_{NEIGHBOR}(J_{TARGET})$ (e.g., one or more physical location neighbor pages $\{PAGE_{NEIGHBOR}(J_{TARGET})\}$), which may be collectively referred to as the physical location neighbor page(s) $\{PAGE_{NEIGHBOR}(J_{TARGET})\}$, of a page $PAGE_{TARGET}(J_{TARGET})$ at any target second address $J_{TARGET}$ among the set of target second addresses $\{J_{TARGET}\}$ to generate at least one reading result (e.g., one or more reading results) of the physical location neighbor page(s) $\{PAGE_{NEIGHBOR}(J_{TARGET})\}$, for determining whether the physical location neighbor page(s) $\{PAGE_{NEIGHBOR}(J_{TARGET})\}$ are healthy, for example, based on whether the error count(s) $\{ERROR\_CNT\}$ (or the number(s) of errors $\{ERROR\_CNT\}$) thereof are less than a predetermined error count threshold $ERROR\_CNT_{THRESHOLD}$, and determine any unhealthy physical location neighbor page $PAGE_{NEIGHBOR}(J_{TARGET})$ among the physical location neighbor page(s) $\{PAGE_{NEIGHBOR}(J_{TARGET})\}$ to be a read-disturbance-affected page $PAGE_{RD}(J_{TARGET})$, for being processed in advanced before the read-disturbance-affected page $PAGE_{RD}(J_{TARGET})$ is damaged. For example, the aforementioned any unhealthy physical location neighbor page $PAGE_{NEIGHBOR}(J_{TARGET})$ may be an unhealthy physical location neighbor page $PAGE_{NEIGHBOR}(J_{TARGET})$ with the error count $ERROR\_CNT$ thereof reaching (or being greater than or equal to) the predetermined error count threshold $ERROR\_CNT_{THRESHOLD}$.

The flash memory controller 110 may write any partial data stored in the read-disturbance-affected page $PAGE_{RD}(J_{TARGET})$ into a new page at a new address in the second memory address space 201 to protect the aforementioned any partial data, for maintaining the data integrity of the data in the flash memory module 120, and may mark the read-disturbance-affected page $PAGE_{RD}(J_{TARGET})$ as an invalid physical page, to allow the read-disturbance-affected page $PAGE_{RD}(J_{TARGET})$ to be damaged by further reading at the aforementioned any target second address $J_{TARGET}$, without degrading the data integrity of the data in the flash memory module 120. For example, the new address may represent a physical address among the multiple physical addresses mentioned above, and the flash memory controller 110 may establish at least one logical-to-physical (L2P) address mapping table in the flash memory module 120, for managing relationships between the physical addresses and the logical addresses, and update the aforementioned at least one L2P address mapping table in order to record a relationship between the new address such as this physical address and a host address such as a logical address of the aforementioned any partial data.

For better comprehension, the symbol "$J_{TARGET}$" of the aforementioned any target second address $J_{TARGET}$ as well as that in the respective symbols of the page $PAGE_{TARGET}(J_{TARGET})$, the physical location neighbor page(s) $\{PAGE_{NEIGHBOR}(J_{TARGET})\}$, the aforementioned any unhealthy physical location neighbor page $PAGE_{NEIGHBOR}(J_{TARGET})$ and the read-disturbance-affected page $PAGE_{RD}(J_{TARGET})$ may be appended with "(1)" for indicating that the aforementioned any unhealthy physical location neighbor page $PAGE_{NEIGHBOR}(J_{TARGET}(1))$ (or the read-disturbance-affected page $PAGE_{RD}(J_{TARGET}(1))$) among the physical location neighbor page(s) $\{PAGE_{NEIGHBOR}(J_{TARGET}(1))\}$ of the page $PAGE_{TARGET}(J_{TARGET}(1))$ at the aforementioned any target second address $J_{TARGET}(1)$ may have a higher error count $ERROR\_CNT(1)$ (e.g., the highest error count) among the respective error counts $\{ERROR\_CNT\}$ of the associated physical location neighbor pages $\{PAGE_{NEIGHBOR}(J_{TARGET})\}$ corresponding to the set of target second addresses $\{J_{TARGET}\}$ (e.g., the $2^k$ addresses $\{J, (2^j+J), \ldots, ((2^{j*}(2^k-1))+J)\}$ determined in the reverse mapping operation 640). For example, the error count $ERROR\_CNT(1)$ may be higher than the respective error counts $\{ERROR\_CNT\}$ of the physical location neighbor pages $\{PAGE_{NEIGHBOR}(J_{TARGET}(2))\}$ of another page $PAGE_{TARGET}(J_{TARGET}(2))$ at any other target second address $J_{TARGET}(2)$ among the set of target second addresses $\{J_{TARGET}\}$ (e.g., the $2^k$ addresses $\{J, (2^j+J), \ldots, ((2^{j*}(2^k-1))+J)\}$).

In addition, the flash memory controller 110 may read at least one other physical location neighbor page $PAGE_{NEIGHBOR}(J_{TARGET}(2))$ (e.g., one or more other physical location neighbor pages $\{PAGE_{NEIGHBOR}(J_{TARGET}(2))\}$), which may be collectively referred to as the other physical location neighbor page(s) $\{PAGE_{NEIGHBOR}(J_{TARGET}(2))\}$, of the other page $PAGE_{TARGET}(J_{TARGET}(2))$ at the aforementioned any other target second address $J_{TARGET}(2)$ among the set of target second addresses $\{J_{TARGET}\}$ to generate at least one other reading result (e.g., one or more other reading results) of the other physical location neighbor page(s) $\{PAGE_{NEIGHBOR}(J_{TARGET}(2))\}$, for determining whether the other physical location neighbor page(s) $\{PAGE_{NEIGHBOR}(J_{TARGET}(2))\}$ are healthy, and selectively reset the read count $RC(J)$ (e.g., the highest read count $RC(J0)$ for the case of $J=J0$) as zero on the read count table 220 according to whether the other physical location neighbor page(s) $\{PAGE_{NEIGHBOR}(J_{TARGET}(2))\}$ are healthy. More particularly, if it is determined that the other physical location neighbor page(s) $\{PAGE_{NEIGHBOR}(J_{TARGET}(2))\}$ are healthy, for example, with the error count(s) $\{ERROR\_CNT\}$ thereof being less than the predetermined error count threshold $ERROR\_CNT_{THRESHOLD}$, the flash memory controller 110 may reset the highest read count $RC(J)$ as zero on the read count table 220. If it is determined that the other physical location neighbor page(s) $\{PAGE_{NEIGHBOR}(J_{TARGET}(2))\}$ are not healthy, for example, with the error count(s) $\{ERROR\_CNT\}$ thereof reaching (or being greater than or equal to) the predetermined error count threshold $ERROR\_CNT_{THRESHOLD}$, the flash memory controller 110 may decrease the highest read count $RC(J)$ as a non-zero value on the read count table 220 rather than resetting the highest read count $RC(J)$ as zero, for making the latest read count $RC(J)$ (which has been decreased from the highest read count $RC(J)$ to become the non-zero value) reach the first read count threshold $RC_{THRESHOLD}$ again as soon as possible, to allow the probability of the occurrence of performing the media scan procedure 645 with respect to at least one remaining target second address $J_{TARGET}$ excluding the aforementioned any target second address $J_{TARGET}(1)$ among the set of target second addresses $\{J_{TARGET}\}$ to be higher than that of the occurrence of performing the media scan procedure 645 with respect to another set of target second addresses $\{J_{TARGET}'\}$ corresponding to another first address (e.g., any remaining first address excluding the aforementioned first address at which the highest first read count RC is detected, among the multiple first addresses), where the aforementioned at least one remaining target second address $J_{TARGET}$ comprises the aforementioned any other target second address $J_{TARGET}(2)$. For brevity, similar descriptions for these embodiments are not repeated in detail here.

Figure 7:
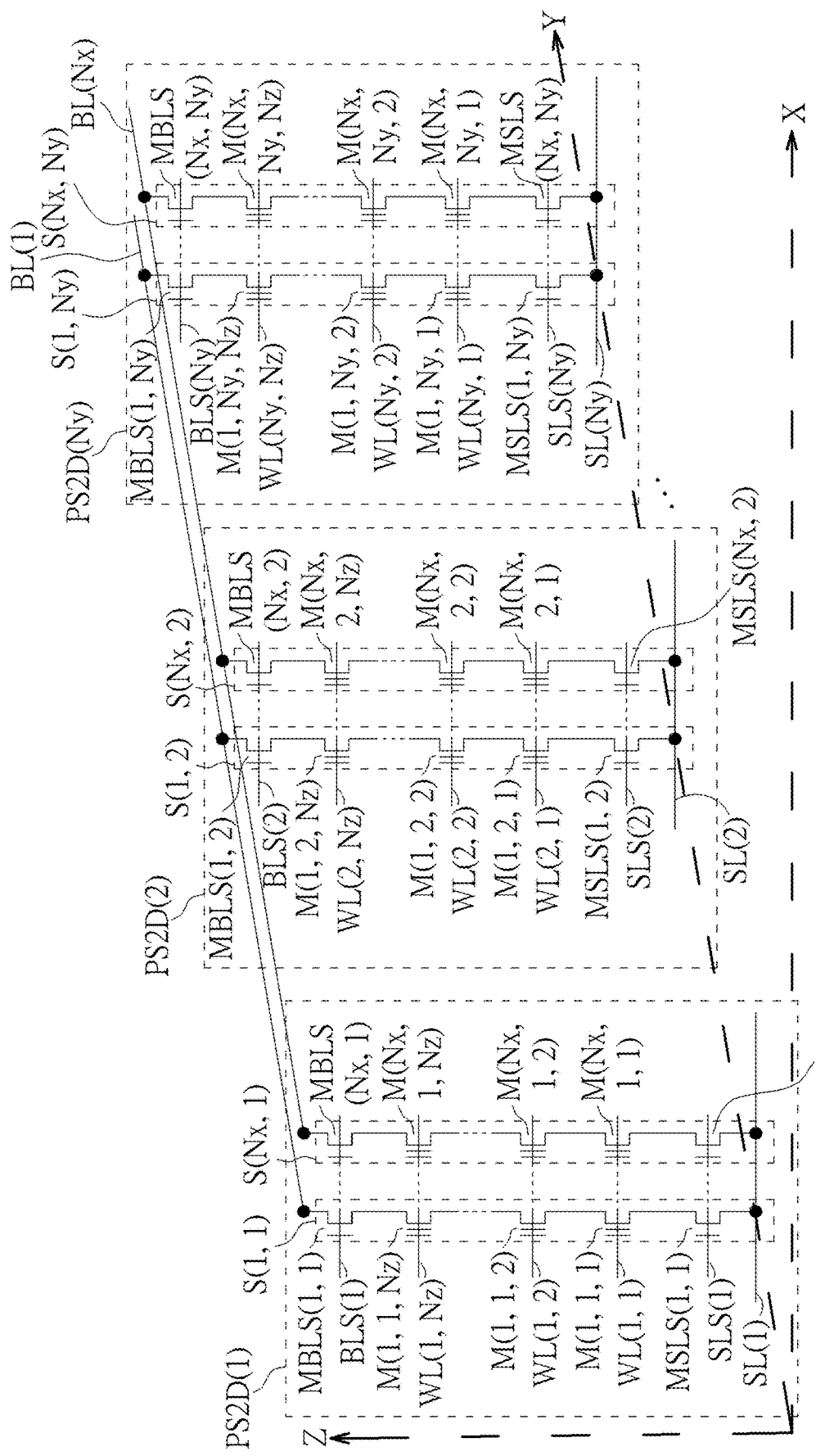
FIG. 7 is a diagram of a 3D NAND flash memory involved with the method according to an embodiment of the present invention.

FIG. 7 is a diagram of a 3D NAND flash memory involved with the method according to an embodiment of the present invention, where any memory element among the plurality of flash memory elements 122-1, 122-2 . . . and 122-N, such as the aforementioned any flash memory element 122-n, may be implemented by way of the 3D NAND flash memory shown in FIG. 7, but the present invention is not limited thereto.

According to this embodiment, the 3D NAND flash memory may comprise a plurality of memory cells arranged in a 3D structure, such as (Nx*Ny*Nz) memory cells {{M(1, 1, 1), . . . , M(Nx, 1, 1)}, {M(1, 2, 1), . . . , M(Nx, 2, 1)}, . . . , {M(1, Ny, 1), . . . , M(Nx, Ny, 1)}}, {{M(1, 1, 2), . . . , M(Nx, 1, 2)}, {M(1, 2, 2), . . . , M(Nx, 2, 2)}, . . . , {M(1, Ny, 2), . . . , M(Nx, Ny, 2)}}, . . . , and {{M(1, 1, Nz), . . . , M(Nx, 1, Nz)}, {M(1, 2, Nz), . . . , M(Nx, 2, Nz)}, . . . , {M(1, Ny, Nz), . . . , M(Nx, Ny, Nz)}} that are respectively arranged in Nz layers perpendicular to the Z-axis and aligned in three directions respectively corresponding to the X-axis, the Y-axis, and the Z-axis, and may further comprise a plurality of selector circuits for selection control, such as (Nx*Ny) upper selector circuits {MBLS(1, 1), . . . , MBLS(Nx, 1)}, {MBLS(1, 2), . . . , MBLS(Nx, 2)}, . . . , and {MBLS(1, Ny), . . . , MBLS(Nx, Ny)} that are arranged in an upper layer above the Nz layers and (Nx*Ny) lower selector circuits {MSLS(1, 1), . . . , MSLS(Nx, 1)}, {MSLS(1, 2), . . . , MSLS(Nx, 2)}, . . . , and {MSLS(1, Ny), . . . , MSLS(Nx, Ny)} that are arranged in a lower layer below the Nz layers. In addition, the 3D NAND flash memory may comprise a plurality of bit lines and a plurality of word lines for access control, such as Nx bit lines BL(1), . . . , and BL(Nx) that are arranged in a top layer above the upper layer and (Ny*Nz) word lines {WL(1, 1), WL(2, 1), . . . , WL(Ny, 1)}, {WL(1, 2), WL(2, 2), . . . , WL(Ny, 2)}, . . . , and {WL(1, Nz), WL(2, Nz), . . . , WL(Ny, Nz)} that are respectively arranged in the Nz layers. Additionally, the 3D NAND flash memory may comprise a plurality of selection lines for selection control, such as Ny upper selection lines BLS(1), BLS(2), . . . , and BLS(Ny) that are arranged in the upper layer and Ny lower selection lines SLS(1), SLS(2), . . . , and SLS(Ny) that are arranged in the lower layer, and may further comprise a plurality of source lines for providing reference levels, such as Ny source lines SL(1), SL(2), . . . , and SL(Ny) that are arranged in a bottom layer below the lower layer.

As shown in FIG. 7, the 3D NAND flash memory may be divided into Ny circuit modules PS2D(1), PS2D(2), . . . , and PS2D(Ny) distributed along the Y-axis. For better comprehension, the circuit modules PS2D(1), PS2D(2), . . . , and PS2D(Ny) may have some electrical characteristics similar to that of a planar NAND flash memory having memory cells arranged in a single layer, and therefore may be regarded as pseudo-2D circuit modules, respectively, but the present invention is not limited thereto. In addition, any circuit module PS2D(ny) of the circuit modules PS2D(1), PS2D(2), . . . , and PS2D(Ny) may comprise Nx secondary circuit modules S(1, ny), . . . , and S(Nx, ny), where "ny" may represent any integer in the interval [1, Ny]. For example, the circuit module PS2D(1) may comprise Nx secondary circuit modules S(1, 1), . . . , and S(Nx, 1), the circuit module PS2D(2) may comprise Nx secondary circuit modules S(1, 2), . . . , and S(Nx, 2), . . . , and the circuit module PS2D(Ny) may comprise Nx secondary circuit modules S(1, Ny), . . . , and S(Nx, Ny). In the circuit module PS2D(ny), any secondary circuit module S(nx, ny) of the secondary circuit modules S(1, ny), . . . , and S(Nx, ny) may comprise Nz memory cells M(nx, ny, 1), M(nx, ny, 2), . . . , and M(nx, ny, Nz), and may comprise a set of selector circuits corresponding to the memory cells M(nx, ny, 1), M(nx, ny, 2), . . . , and M(nx, ny, Nz), such as the upper selector circuit MBLS(nx, ny) and the lower selector circuit MSLS(nx, ny), where "nx" may represent any integer in the interval [1, Nx]. The upper selector circuit MBLS(nx, ny) and the lower selector circuit MSLS(nx, ny) and the memory cells M(nx, ny, 1), M(nx, ny, 2), . . . , and M(nx, ny, Nz) may be implemented with transistors. For example, the upper selector circuit MBLS(nx, ny) and the lower selector circuit MSLS(nx, ny) may be implemented with ordinary transistors without any floating gate, and any memory cell M(nx, ny, nz) of the memory cells M(nx, ny, 1), M(nx, ny, 2), . . . , and M(nx, ny, Nz) may be implemented with a floating gate transistor, where "nz" may represent any integer in the interval [1, Nz], but the present invention is not limited thereto. Further, the upper selector circuits MBLS(1, ny), . . . , and MBLS(Nx, ny) in the circuit module PS2D(ny) may perform selection according to the selection signal on the corresponding selection line BLS(ny), and the lower selector circuits MSLS(1, ny), . . . , and MSLS(Nx, ny) in the circuit module PS2D(ny) may perform selection according to the selection signal on the corresponding selection line SLS(ny).

Figure 8:
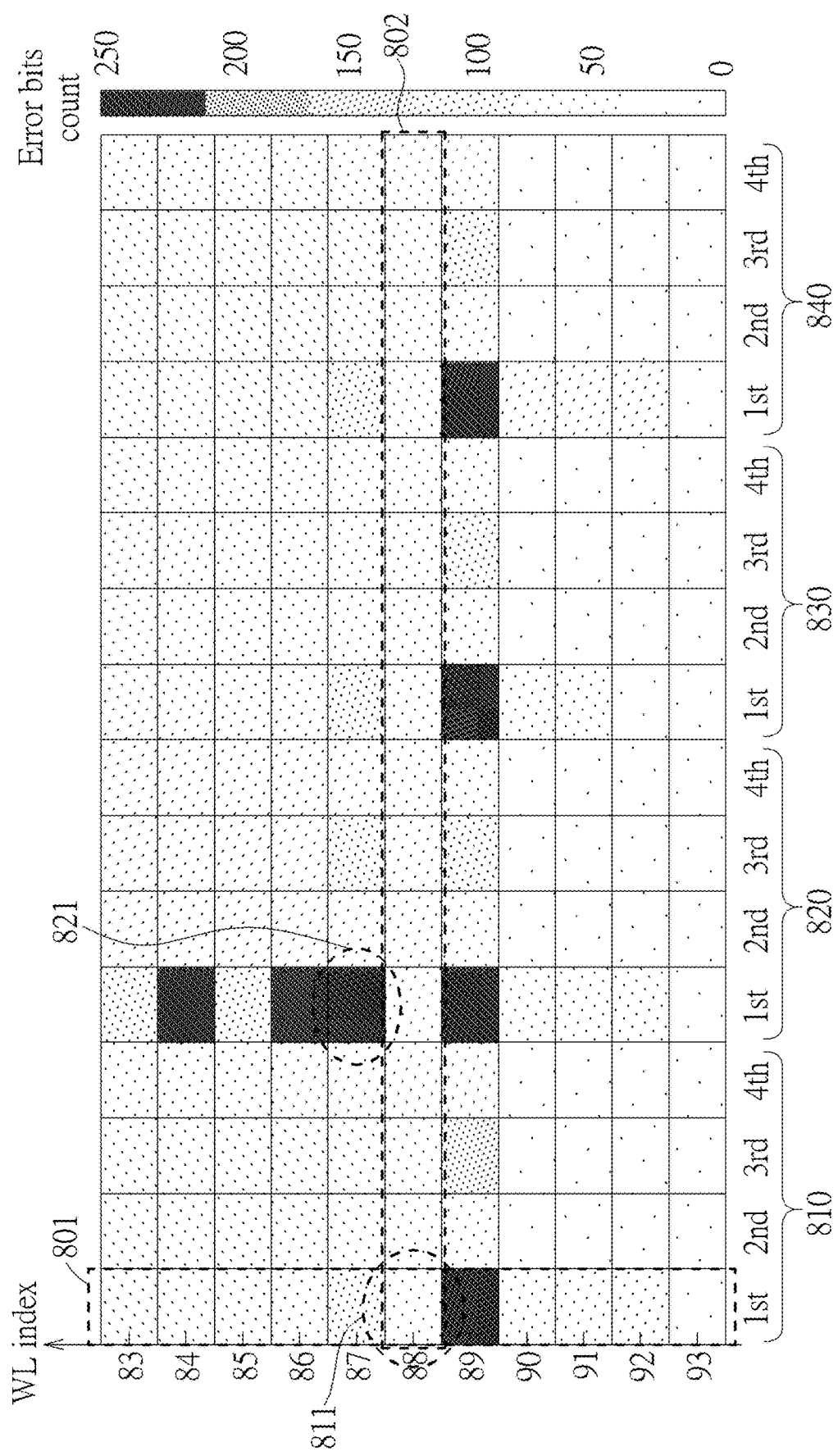
FIG. 8 illustrates a read-disturbance location relationship according to an embodiment of the present invention.

FIG. 8 illustrates a read-disturbance location relationship according to an embodiment of the present invention. For example, the NV memory such as the flash memory module 120 may be configured as a quad-level cells (QLC) flash memory, but the present invention is not limited thereto. In some examples, the level count (e.g., four, for the QLC flash memory) of the memory cells (e.g., the QLCs) in the flash memory module 120 may vary. As shown in FIG. 8, the horizontal axis may be labeled with four sets of pages 810, 820, 830 and 840, for indicating that each layer among the Nz layers may comprise four pair pages and that each pair page among the four pair pages may comprise four pages, including a first (1st) page, a second (2nd) page, a third (3rd) page and a fourth (4th) page (labeled "1st", "2nd", "3rd" and "4th" for brevity) respectively corresponding to the four levels of the QLCs in the flash memory module 120, where each QLC among the QLCs may be arranged to store four bits. The Y-axis may represent the word-line index (labeled "WL index" for brevity), such as an index corresponding to the Nz layers (e.g., the Nz physical stacking layers). In addition, a portion of pages (e.g., the pages corresponding to the interval [83, 93] on the Y-axis) may be illustrated with the small rectangles having various types of shadings for indicating different levels of error bits counts, respectively, while the other portion of pages may be omitted for brevity.

The read disturbance (or the read attack) may occur in a layer 802 with the word-line index being equal to 88, and more particularly, occur mainly at one of the respective 1st pages 801 of the first pair pages (or the set of pages 810), such as the 1st page 811 of the first pair page in the layer 802, and therefore may be regarded as the single page read disturbance. The page under attack, such as the 1st page 811 of the first pair page in the layer 802, may be taken as an example of the page $PAGE_{TARGET}(J_{TARGET})$ at the aforementioned any target second address $J_{TARGET}$, and the physical location neighbor pages of the 1st page 811 may be taken as examples of the physical location neighbor page(s) $\{PAGE_{NEIGHBOR}(J_{TARGET})\}$. The page $PAGE_{TARGET}$ ($J_{TARGET}$) such as the 1st page 811 does not have a large number of error bits. Instead, one or more unhealthy physical location neighbor pages $\{PAGE_{NEIGHBOR}(J_{TARGET})\}$ such as the 1st page of the adjacent layer below the 1st page 811 and the 1st page of the second pair page in the same adjacent layer as well as the 1st page 821 of the second pair page in another adjacent layer may have large numbers of error bits, respectively. The flash memory controller 110 operating according to the method can write the partial data stored in the one or more unhealthy physical location neighbor pages $\{PAGE_{NEIGHBOR}(J_{TARGET})\}$ such as the pages 821, etc. into new pages at new addresses in the second memory address space 201, respectively, to protect the respective partial data of the pages 821, etc., for maintaining the data integrity of the data in the flash memory module 120. For brevity, similar descriptions for this embodiment are not repeated in detail here.

According to some embodiments, the level count (e.g., four, for the QLC flash memory) of the memory cells (e.g., the QLCs) in the flash memory module 120, the page count per pair page, the pair page count per layer (e.g., four, for the four sets of pages 810, 820, 830 and 840), the pages involved with the embodiment shown in FIG. 8, the associated error bits counts of the pages, the way for illustrating the associated error bits counts as shown in FIG. 8, the word-line index (e.g., 88) of the layer 802 in which the read disturbance occurs, the page $PAGE_{TARGET}(J_{TARGET})$ such as the 1st page 811, and/or the one or more unhealthy physical location neighbor pages $\{PAGE_{NEIGHBOR}(J_{TARGET})\}$ such as the 1st page 821, etc. may vary. In addition, the 1st page, the 2nd page, the 3rd page and the 4th page may also be referred to as the lower page (LP), the middle page (MP), the upper page (UP) and the top page (TP), respectively, and the four pair pages may also be referred to as the four sub-blocks. For brevity, similar descriptions for these embodiments are not repeated in detail here.

Figure 9:
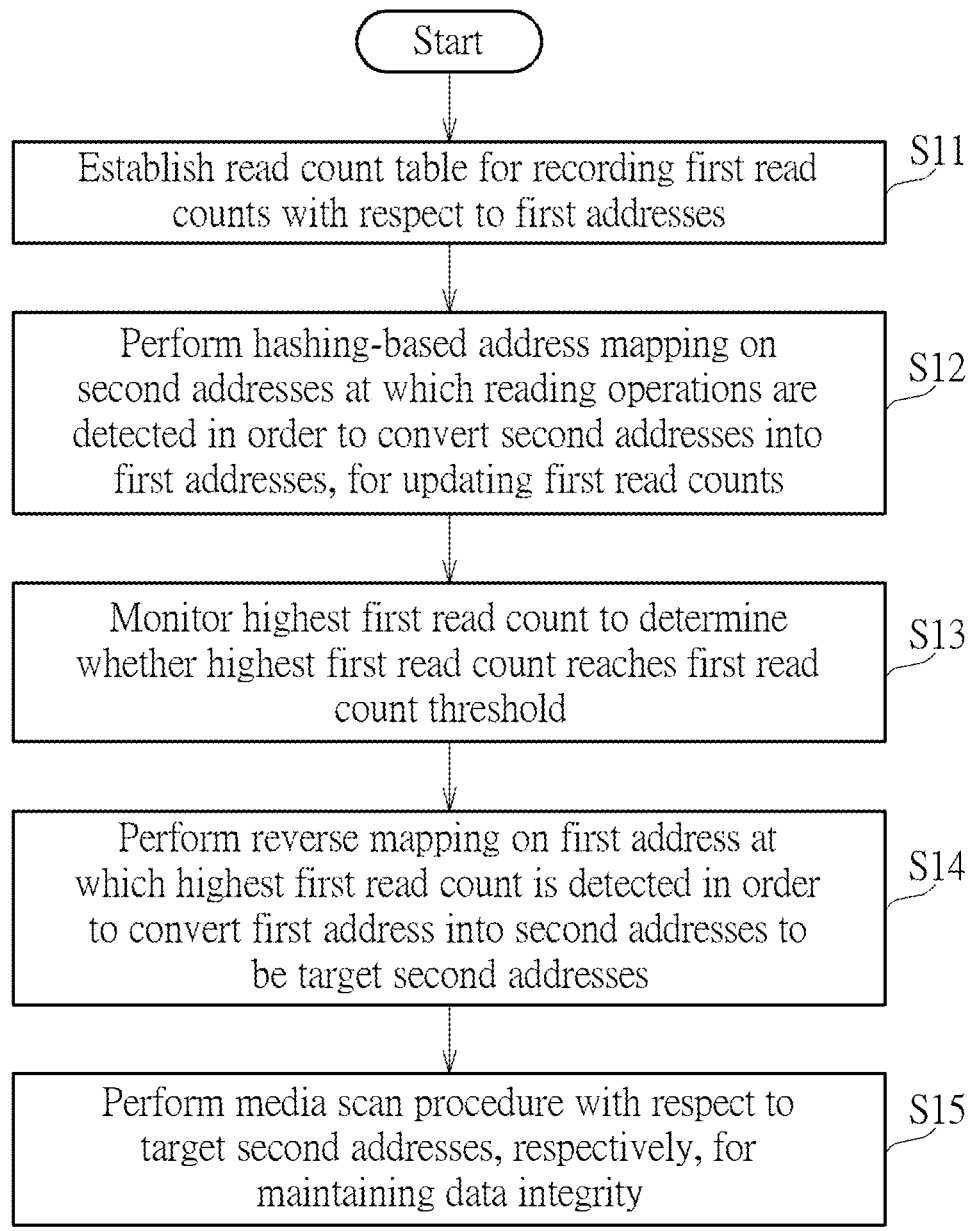
FIG. 9 illustrates a working flow of the method according to an embodiment of the present invention.

FIG. 9 illustrates a working flow of the method according to an embodiment of the present invention. The aforementioned memory controller such as the flash memory controller 110 may operate according to the working flow shown in FIG. 9 to execute Steps S11 to S15, but the present invention is not limited thereto.

In Step S11, the flash memory controller 110 may establish the read count table 220 for recording the multiple first read counts $\{RC\}$ with respect to the multiple first addresses, where the multiple first addresses may belong to the first memory address space 202 which is smaller than the second memory address space 201. For example, the multiple first read counts $\{RC\}$ may comprise the read counts $\{RC(0), RC(1), \ldots, RC(2^j-1)\}$ in the read count table 220, and the multiple first addresses may comprise the $2^j$ addresses $\{0, 1, \ldots, (2^j-1)\}$ in the first memory address space 202.

In Step S12, the flash memory controller 110 may perform the hashing-based address mapping on at least one sub-set of the multiple second addresses, such as the set of second addresses at which reading operations are detected, in order to convert the set of second addresses into the set of first addresses among the multiple first addresses, for updating the set of first read counts $\{RC\}$ among the multiple first read counts $\{RC\}$ with respect to the set of first addresses on the read count table 220, where the set of second addresses belong to the second memory address space 201.

In Step S13, the flash memory controller 110 may monitor at least the highest first read count RC among the multiple first read counts $\{RC\}$ on the read count table 220, such as the highest read count RC(J0), to determine whether the highest first read count RC reaches the first read count threshold RCTHRESHOLD.

In Step S14, in response to the highest first read count RC (e.g., the highest read count RC(J0)) reaching the first read count threshold RCTHRESHOLD, the flash memory controller 110 may perform the reverse mapping of the hashing-based address mapping on the first address at which the highest first read count RC is detected in order to convert the first address into all second addresses corresponding to the first address, such as all second addresses mapped to the first address in the hashing-based address mapping, to be a set of target second addresses. For example, the first address may represent the address J such as the address J0, and the aforementioned all second addresses corresponding to the first address may represent the $2^k$ addresses $\{J, (2^j+J), \ldots, ((2^j*(2^k-1))+J)\}$ such as the addresses $\{J0, (2^j+J0), \ldots, ((2^j*(2^k-1))+J0)\}$.

In Step S15, the flash memory controller 110 may perform the media scan procedure 645 with respect to the set of target second addresses, respectively, for maintaining data integrity of data in the NV memory such as the flash memory module 120. For brevity, similar descriptions for this embodiment are not repeated in detail here.

For better comprehension, the method may be illustrated with the working flow shown in FIG. 9, but the present invention is not limited thereto. According to some embodiments, one or more steps may be added, deleted, or changed in the working flow shown in FIG. 9. For example, the flash memory controller 110 may perform the media scan procedure 645 to test the respective physical location neighbor pages $\{PAGE_{NEIGHBOR}(J_{TARGET})\}$ of the pages $\{PAGE_{TARGET}(J_{TARGET})\}$ at the set of target second addresses $\{J_{TARGET}\}$ (e.g., the $2^k$ addresses $\{J, (2^j+J), \ldots, ((2^j*(2^k-1))+J)\}$ determined in the reverse mapping operation 640), and determine the physical location neighbor page health of these physical location neighbor pages $\{PAGE_{NEIGHBOR}(J_{TARGET})\}$ to perform the data protection in advance, in order to prevent the data in the flash memory module 120 from being damaged by the read disturbance, for maintaining the data integrity of the data. In addition, the flash memory controller 110 may determine the error count ERROR_CNT(1) of the aforementioned any unhealthy physical location neighbor page $PAGE_{NEIGHBOR}(J_{TARGET}(1))$ among the physical location neighbor page(s) $\{PAGE_{NEIGHBOR}(J_{TARGET}(1))\}$ of the page $PAGE_{TARGET}(J_{TARGET}(1))$ at the aforementioned any target second address $J_{TARGET}(1)$, as well as the respective error counts $\{ERROR\_CNT(2), ERROR\_CNT(3), \ldots\}$ of the physical location neighbor pages $\{PAGE_{NEIGHBOR}(J_{TARGET}(2)), PAGE_{NEIGHBOR}(J_{TARGET}(3)), \ldots\}$ of the other pages $\{PAGE_{TARGET}(J_{TARGET}(2)), PAGE_{TARGET}(J_{TARGET}(3)), \ldots\}$ at the other target second addresses $\{J_{TARGET}(2), J_{TARGET}(3), \ldots\}$ among the set of target second addresses $\{J_{TARGET}\}$. For example, ERROR_CNT(1)>ERROR_CNT(2), ERROR_CNT(2)>ERROR_CNT(3), and the rest may be deduced by analogy. When the respective error counts $\{ERROR\_CNT(CNT\_index)|CNT\_index>1\}$ of the physical location neighbor pages $\{PAGE_{NEIGHBOR}(J_{TARGET}(CNT\_index))|CNT\_index>1\}$ of the other page $PAGE_{TARGET}(J_{TARGET}(CNT\_index)|CNT\_index>1)$ at the other target second address $J_{TARGET}(CNT\_index>1)$ (e.g., any of all other target second addresses $\{J_{TARGET}\}$ among the set of target second addresses $\{J_{TARGET}\}$, except the aforementioned any target second address $J_{TARGET}(1)$), such as the respective error counts $\{ERROR\_CNT(2)\}$ of the physical location neighbor pages $\{PAGE_{NEIGHBOR}(J_{TARGET}(2))\}$ of the other page $PAGE_{TARGET}(J_{TARGET}(2))$ at the aforementioned any other target second address $J_{TARGET}(2)$ for the case of CNT_index=2, are less than the predetermined error count threshold $ERROR\_CNT_{THRESHOLD}$, the flash memory controller 110 may determine that the physical location neighbor pages $\{PAGE_{NEIGHBOR}(J_{TARGET}(CNT\_index))|CNT\_index>1\}$ such as the physical location neighbor pages $\{PAGE_{NEIGHBOR}(J_{TARGET}(2))\}$ are healthy and reset the highest read count RC(J) as zero on the read count table 220. When any error count ERROR_CNT(CNT_index) among the respective error counts $\{ERROR\_CNT(CNT\_index)|CNT\_index>1\}$ of the physical location neighbor pages $\{PAGE_{NEIGHBOR}(J_{TARGET}(CNT\_index))|CNT\_index>1\}$ of the other page $PAGE_{TARGET}(J_{TARGET}(CNT\_index)|CNT\_index>1)$ at the other target second address $J_{TARGET}(CNT\_index>1)$ (e.g., any of all other target second addresses $\{J_{TARGET}\}$ among the set of target second addresses $\{J_{TARGET}\}$, except the aforementioned any target second address $J_{TARGET}(1)$), such as any error count ERROR_CNT (2) among the respective error counts $\{ERROR\_CNT(2)\}$ of the physical location neighbor pages $\{PAGE_{NEIGHBOR}(J_{TARGET}(2))\}$ of the other page $PAGE_{TARGET}(J_{TARGET}(2))$ at the aforementioned any other target second address $J_{TARGET}(2)$ for the case of CNT_index=2, reaches (or is greater than or equal to) the predetermined error count threshold $ERROR\_CNT_{THRESHOLD}$, the flash memory controller 110 may determine that at least one physical location neighbor page $PAGE_{NEIGHBOR}(J_{TARGET}(CNT\_index))$ among the physical location neighbor pages $\{PAGE_{NEIGHBOR}(J_{TARGET}(CNT\_index))|CNT\_index>1\}$, such as at least one physical location neighbor page $PAGE_{NEIGHBOR}(J_{TARGET}(2))$ among these physical location neighbor pages $\{PAGE_{NEIGHBOR}(J_{TARGET}(2))\}$, is unhealthy and decrease the highest read count RC(J) as the non-zero value on the read count table 220 rather than resetting the highest read count RC(J) as zero. For brevity, similar descriptions for these embodiments are not repeated in detail here.

Figure 10:
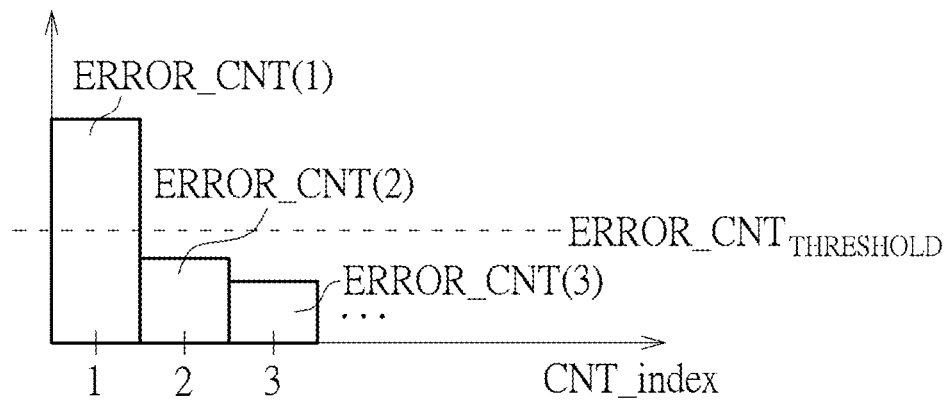
FIG. 10 illustrates a read-count clear and reduction control scheme of the method according to an embodiment of the present invention.
Figure 10:
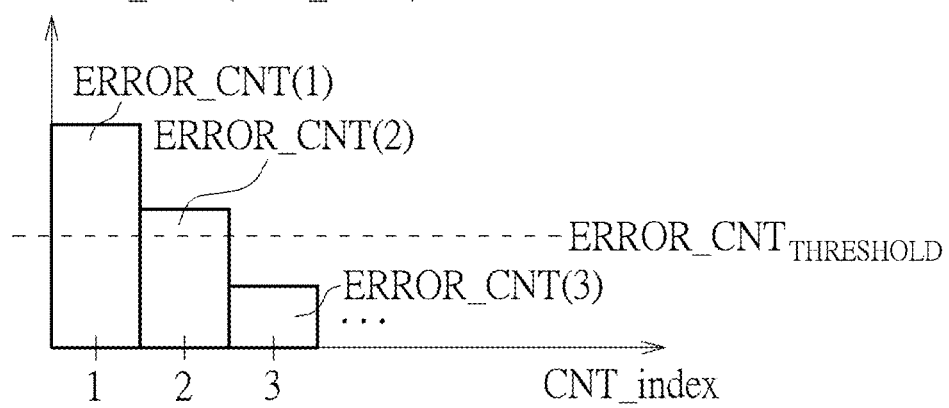
Figure 10:
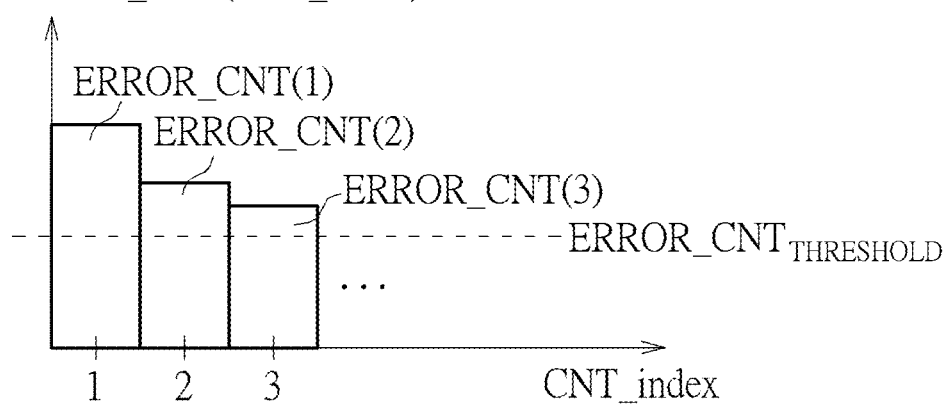

FIG. 10 illustrates a read-count clear and reduction control scheme of the method according to an embodiment of the present invention. The horizontal axis may represent the error count index CNT_index, and the vertical axis may represent the error count ERROR_CNT(CNT_index) such as the error counts $\{ERROR\_CNT(CNT\_index)|CNT\_index=1, 2, 3, \ldots\}$, where the error count index CNT_index may be equal to a positive integer. For example, the error counts $\{ERROR\_CNT(CNT\_index)|CNT\_index=1, 2, 3, \ldots\}$ may be illustrated as ERROR_CNT(1)>ERROR_CNT(2)>ERROR_CNT(3)>..., and one error count ERROR_CNT(CNT_index) may be illustrated for any case among the cases of CNT_index=1, CNT_index=2, CNT_index=3, etc., but the present invention is not limited thereto. In some examples, the error counts $\{ERROR\_CNT(CNT\_index)|CNT\_index=1, 2, 3, \ldots\}$ may vary, and more particularly, may be illustrated as ERROR_CNT(1)≥ERROR_CNT(2)≥ERROR_CNT(3)≥..., and/or one or more error counts $\{ERROR\_CNT(CNT\_index)\}$ may be illustrated for any case among the cases of CNT_index=1, CNT_index=2, CNT_index=3, etc.

When it is detected that the error counts $\{ERROR\_CNT\}$ corresponding to any of all other target second addresses $\{J_{TARGET}\}$ among the set of target second addresses $\{J_{TARGET}\}$ except the aforementioned any target second address $J_{TARGET}(1)$ are less than the predetermined error count threshold $ERROR\_CNT_{THRESHOLD}$, for example, in a situation where the respective error counts $\{ERROR\_CNT(2)\}$ of the physical location neighbor pages $\{PAGE_{NEIGHBOR}(J_{TARGET}(2))\}$ of the other page $PAGE_{TARGET}(J_{TARGET}(2))$ at the aforementioned any other target second address $J_{TARGET}(2)$ are less than the predetermined error count threshold $ERROR\_CNT_{THRESHOLD}$ as shown in the sub-diagram (a), the flash memory controller 110 may determine that the physical location neighbor pages $\{PAGE_{NEIGHBOR}(J_{TARGET}(2))\}$ are healthy and reset the highest read count RC(J) as zero on the read count table 220. In this situation, when determining that the physical location neighbor pages $\{PAGE_{NEIGHBOR}(J_{TARGET}(2))\}$ are healthy according to ERROR_CNT(2)<ERROR_CNT_{THRESHOLD}, the flash memory controller 110 may determine that the physical location neighbor pages $\{PAGE_{NEIGHBOR}(J_{TARGET}(2)), PAGE_{NEIGHBOR}(J_{TARGET}(3)), \ldots\}$ are healthy according to ERROR_CNT_{THRESHOLD}>ERROR_CNT(2)≥ERROR_CNT(3)≥..., and reset the highest read count RC(J) as zero on the read count table 220. When it is detected that any error count ERROR_CNT among the error counts $\{ERROR\_CNT\}$ corresponding to any of all other target second addresses $\{J_{TARGET}\}$ among the set of target second addresses $\{J_{TARGET}\}$ except the aforementioned any target second address $J_{TARGET}(1)$ reaches (or is greater than or equal to) the predetermined error count threshold $ERROR\_CNT_{THRESHOLD}$, for example, in a situation where any error count ERROR_CNT(2) among the respective error counts $\{ERROR\_CNT(2)\}$ of the physical location neighbor pages $\{PAGE_{NEIGHBOR}(J_{TARGET}(2))\}$ of the other page $PAGE_{TARGET}(J_{TARGET}(2))$ at the aforementioned any other target second address $J_{TARGET}(2)$ reaches (or is greater than or equal to) the predetermined error count threshold $ERROR\_CNT_{THRESHOLD}$ as shown in any sub-diagram among the sub-diagrams (b) and (c), the flash memory controller 110 may determine that at least one physical location neighbor page $PAGE_{NEIGHBOR}(J_{TARGET}(2))$ among these physical location neighbor pages $\{PAGE_{NEIGHBOR}(J_{TARGET}(2))\}$ is unhealthy and decrease the highest read count RC(J) as the non-zero value on the read count table 220 rather than resetting the highest read count RC(J) as zero. For brevity, similar descriptions for this embodiment are not repeated in detail here.

According to some embodiments, the predetermined error count threshold $ERROR\_CNT_{THRESHOLD}$ for determining whether the physical location neighbor page(s) $\{PAGE_{NEIGHBOR}(J_{TARGET})\}$ such as the physical location neighbor page(s) $\{PAGE_{NEIGHBOR}(J_{TARGET}(1))\}$, the other physical location neighbor page(s) $\{PAGE_{NEIGHBOR}(J_{TARGET}(2))\}$, etc. are healthy may correspond to the error correction code (ECC) capability of an ECC circuit (not shown) in the architecture shown in FIG. 1. The ECC circuit may perform ECC encoding and ECC decoding, in order to protect data and/or perform error correction for any sub-storage-unit of multiple sub-storage-units within a physical page, and the physical page may be a page at one of the multiple physical addresses, where the multiple sub-storage-units may have a same size such as a predetermined size smaller than that of the physical page, but the present invention is not limited thereto. In addition, the ECC circuit is capable of correcting up to $ERROR\_CNT_{MAX}$ errors (e.g., error bits) within the physical page, and the predetermined error count threshold $ERROR\_CNT_{THRESHOLD}$ may be proportional to the maximum correctable error count per physical page $ERROR\_CNT_{MAX}$ (or "the maximum correctable error count $ERROR\_CNT_{MAX}$"), and more particularly, may be equal to the product (FACTOR*ERROR_CNT$_{MAX}$) of a predetermined factor FACTOR and the maximum correctable error count ERROR_CNT$_{MAX}$. For example, FACTOR=1, but the present invention is not limited thereto. In some examples, the predetermined factor FACTOR may be equal to any other value (e.g., a value within the interval (0, 1)) as long as the implementation of the present invention will not be hindered. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing read-disturbance detection of a memory device with aid of hashing-based address mapping for data integrity control, the method being applicable to a memory controller of the memory device, the memory device comprising the memory controller and a non-volatile (NV) memory, the NV memory comprising at least one NV memory element, the method comprising:
   establishing a read count table for recording multiple first read counts with respect to multiple first addresses, wherein the multiple first addresses belong to a first memory address space which is smaller than a second memory address space;
   performing the hashing-based address mapping on a set of second addresses at which reading operations are detected in order to convert the set of second addresses into a set of first addresses among the multiple first addresses, for updating a set of first read counts among the multiple first read counts with respect to the set of first addresses on the read count table, wherein the set of second addresses belong to the second memory address space;
   monitoring at least a highest first read count among the multiple first read counts on the read count table to determine whether the highest first read count reaches a first read count threshold;
   in response to the highest first read count reaching the first read count threshold, performing reverse mapping of the hashing-based address mapping on a first address at which the highest first read count is detected in order to convert the first address into all second addresses corresponding to the first address to be a set of target second addresses; and
   performing a media scan procedure with respect to the set of target second addresses, respectively, for maintaining data integrity of data in the NV memory.

2. The method of claim 1, wherein multiple second addresses belonging to the second memory address space represent multiple physical addresses of the NV memory that are accessible by the memory controller, wherein the multiple second addresses comprise the set of second addresses.

3. The method of claim 1, wherein the memory controller is arranged to record the multiple first read counts with respect to the multiple first addresses on the read count table, having no need to record multiple second read counts with respect to the multiple second addresses on any other read count table which is greater than the read count table.

4. The method of claim 3, wherein the memory controller is arranged to monitor at least the highest first read count among the multiple first read counts on the read count table to determine whether the highest first read count reaches the first read count threshold, having no need to monitor any highest second read count among the multiple second read counts on the any other read count table to determine whether the highest second read count reaches any second read count threshold.

5. The method of claim 1, wherein converting the set of second addresses into the set of first addresses among the multiple first addresses further comprises:
   converting the set of second addresses into the set of first addresses among the multiple first addresses with a hashing function.

6. The method of claim 5, wherein converting the first address into said all second addresses corresponding to the first address further comprises:
   converting the first address into said all second addresses corresponding to the first address with a reverse hashing function.

7. The method of claim 6, wherein the reverse hashing function is implemented as a multivalued function for performing the reverse mapping.

8. The method of claim 1, wherein the hashing-based address mapping represents a first mapping for mapping any group of inputs among multiple groups of inputs of the first mapping into a same output among multiple outputs of the first mapping.

9. The method of claim 8, wherein the first mapping is implemented by way of a modulo function.

10. The method of claim 1, wherein the reverse mapping represents a second mapping for mapping any input among multiple inputs of the second mapping into a same group of outputs among multiple groups of outputs of the second mapping.

11. The method of claim 1, wherein said all second addresses corresponding to the first address represent all second addresses mapped to the first address in the hashing-based address mapping.

12. The method of claim 1, wherein performing the media scan procedure with respect to the set of target second addresses respectively further comprises:
   reading at least one physical location neighbor page of a page at any target second address among the set of target second addresses to generate at least one reading result of the at least one physical location neighbor page, for determining whether the at least one physical location neighbor page is healthy; and
   determining any unhealthy physical location neighbor page among the at least one physical location neighbor page to be a read-disturbance-affected page, for being processed in advanced before the read-disturbance-affected page is damaged.

13. The method of claim 12, further comprising:
   writing any partial data stored in the read-disturbance-affected page into a new page at a new second address, for maintaining the data integrity of the data in the NV memory; and
   marking the read-disturbance-affected page as an invalid physical page, to allow the read-disturbance-affected page to be damaged by further reading at the any target second address, without degrading the data integrity of the data in the NV memory.

14. The method of claim 13, wherein multiple second addresses belonging to the second memory address space represent multiple physical addresses of the NV memory, wherein the multiple second addresses comprise the set of second addresses; the new second address represents a physical address among the multiple physical addresses; and the method further comprises:

updating at least one logical-to-physical (L2P) address mapping table in the NV memory in order to record a relationship between the physical address and a logical address of the any partial data.

15. The method of claim 12, further comprising:
reading at least one other physical location neighbor page of another page at any other target second address among the set of target second addresses to generate at least one other reading result of the at least one other physical location neighbor page, for determining whether the at least one other physical location neighbor page is healthy; and
selectively resetting the highest first read count as zero on the read count table according to whether the at least one other physical location neighbor page is healthy.

16. The method of claim 15, wherein selectively resetting the highest first read count as zero on the read count table according to whether the at least one other physical location neighbor page is healthy further comprises:
if it is determined that the at least one other physical location neighbor page is healthy, resetting the highest first read count as zero on the read count table; and
if it is determined that the at least one other physical location neighbor page is not healthy, decreasing the highest first read count as a non-zero value on the read count table rather than resetting the highest first read count as zero, to allow a probability of occurrence of performing the media scan procedure with respect to at least one remaining target second address excluding the any target second address among the set of target second addresses to be higher than that of occurrence of performing the media scan procedure with respect to another set of target second addresses corresponding to another first address, wherein the at least one remaining target second address comprises the any other target second address.

17. A memory controller, for performing read-disturbance detection of a memory device with aid of hashing-based address mapping for data integrity control, the memory device comprising the memory controller and a non-volatile (NV) memory, the NV memory comprising at least one NV memory element, the memory controller comprising:
a processing circuit, arranged to control the memory controller according to a plurality of host commands from a host device, to allow the host device to access the NV memory through the memory controller;
wherein:
the memory controller is arranged to establish a read count table for recording multiple first read counts with respect to multiple first addresses, wherein the multiple first addresses belong to a first memory address space which is smaller than a second memory address space;
the memory controller is arranged to perform the hashing-based address mapping on a set of second addresses at which reading operations are detected in order to convert the set of second addresses into a set of first addresses among the multiple first addresses, for updating a set of first read counts among the multiple first read counts with respect to the set of first addresses on the read count table, wherein the set of second addresses belong to the second memory address space;
the memory controller is arranged to monitor at least a highest first read count among the multiple first read counts on the read count table to determine whether the highest first read count reaches a first read count threshold;
in response to the highest first read count reaching the first read count threshold, the memory controller is arranged to perform reverse mapping of the hashing-based address mapping on a first address at which the highest first read count is detected in order to convert the first address into all second addresses corresponding to the first address to be a set of target second addresses; and
the memory controller is arranged to perform a media scan procedure with respect to the set of target second addresses, respectively, for maintaining data integrity of data in the NV memory.

18. The memory device comprising the memory controller of claim 17, wherein the memory device comprises:
the NV memory, configured to store information; and
the memory controller, coupled to the NV memory, configured to control operations of the memory device.

19. An electronic device comprising the memory device of claim 18, and further comprising:
the host device, coupled to the memory device, wherein the host device comprises:
at least one processor, arranged for controlling operations of the host device; and
a power supply circuit, coupled to the at least one processor, arranged for providing power to the at least one processor and the memory device;
wherein the memory device provides the host device with storage space.

* * * * *